(12) United States Patent
Margulis

(10) Patent No.: US 7,899,864 B2
(45) Date of Patent: *Mar. 1, 2011

(54) MULTI-USER TERMINAL SERVICES ACCELERATOR

(75) Inventor: Neal D. Margulis, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 852 days.

This patent is subject to a terminal disclaimer.

(21) Appl. No.: 11/264,269

(22) Filed: Nov. 1, 2005

(65) Prior Publication Data

US 2007/0097130 A1    May 3, 2007

(51) Int. Cl.
G06F 15/16  (2006.01)
(52) U.S. Cl. ...................................... 709/204
(58) Field of Classification Search ................ 709/204, 709/220, 224, 208, 211, 223; 345/504, 501, 345/502, 503, 520, 530; 340/540
See application file for complete search history.

(56) References Cited

U.S. PATENT DOCUMENTS

| | | | |
|---|---|---|---|
| 5,602,589 A | 2/1997 | Vishwanath | |
| 5,708,961 A | 1/1998 | Hylton | |
| 5,850,482 A | 12/1998 | Meaney | |
| 5,852,437 A | 12/1998 | Wugofski | |
| 5,862,150 A * | 1/1999 | Lavelle et al. | 714/732 |
| 5,909,518 A | 6/1999 | Chui | |
| 5,911,582 A | 6/1999 | Redford | |
| 5,977,933 A | 11/1999 | Wicher | |
| 6,008,847 A * | 12/1999 | Bauchspies | 375/240.01 |
| 6,031,940 A | 2/2000 | Chui | |
| 6,075,906 A | 6/2000 | Fenwick | |
| 6,097,441 A | 8/2000 | Allport | |

(Continued)

FOREIGN PATENT DOCUMENTS

EP    0 590 817    1/1999

OTHER PUBLICATIONS

Millman, S. E., "LP-5: Late-News Poster: Update to VESA Digital Packet Video Link (DPVL) Proposed Standard," SID 04 Digest, 2004, pp. 412-415, ISSN/0004-0966X/04/3501-0412.

(Continued)

*Primary Examiner*—Benjamin R Bruckart
*Assistant Examiner*—Saad A Waqas
(74) *Attorney, Agent, or Firm*—Woodcock Washburn LLP

(57) ABSTRACT

A multi-user host computer system comprises a host computer that processes applications and the desktop environments for multiple remote terminals. The host computer includes a terminal services offload processor to supplement the processing of the host CPU. For each remote terminal, the terminal services offload processor may improve the video and graphics performance and allow the multi-user host computer system to more efficiently support multiple users. The host computer may include a graphics processor that manages a virtual display for each remote terminal and provides selective updates of sub frame data. Where appropriate, the sub frame data is encoded and transmitted over the network to the remote terminals. Video data streams are also optimized by the terminal services offload processor and optimized for the intended remote terminals and their respective network connections. The terminal services offload processor may be implemented in programmable hardware and may be a separate subsystem or may also be used to perform other offload tasks.

17 Claims, 10 Drawing Sheets

U.S. PATENT DOCUMENTS

| | | | |
|---|---|---|---|
| 6,104,334 | A | 8/2000 | Allport |
| 6,141,059 | A | 10/2000 | Boyce |
| 6,141,447 | A | 10/2000 | Linzer |
| 6,222,885 | B1 | 4/2001 | Chaddha |
| 6,256,019 | B1 | 7/2001 | Allport |
| 6,263,503 | B1 | 7/2001 | Margulis |
| 6,323,854 | B1 * | 11/2001 | Knox et al. ................. 345/418 |
| 6,340,994 | B1 | 1/2002 | Margulis |
| 6,409,602 | B1 | 6/2002 | Wiltshire |
| 6,437,803 | B1 | 8/2002 | Panasyuk |
| 6,456,340 | B1 | 9/2002 | Margulis |
| 6,510,177 | B1 | 1/2003 | De Bonet |
| 6,600,838 | B2 | 7/2003 | Chui |
| 6,611,530 | B1 | 8/2003 | Apostolopoulos |
| 6,628,716 | B1 | 9/2003 | Tan |
| 6,658,019 | B1 | 12/2003 | Chen |
| 6,664,969 | B1 * | 12/2003 | Emerson et al. ............. 345/544 |
| 6,701,380 | B2 | 3/2004 | Schneider |
| 6,721,837 | B2 | 4/2004 | Tang |
| 6,754,266 | B2 | 6/2004 | Bahl |
| 6,757,851 | B1 | 6/2004 | Park |
| 6,768,775 | B1 | 7/2004 | Wen |
| 6,771,828 | B1 | 8/2004 | Malvar |
| 6,774,912 | B1 | 8/2004 | Ahmed |
| 6,781,601 | B2 | 8/2004 | Cheung |
| 6,785,700 | B2 | 8/2004 | Masud |
| 6,798,838 | B1 | 9/2004 | Ngo |
| 6,806,885 | B1 * | 10/2004 | Piper et al. ................. 345/545 |
| 6,807,308 | B2 | 10/2004 | Chui |
| 6,816,194 | B2 | 11/2004 | Zhang |
| 6,826,242 | B2 | 11/2004 | Ojard |
| 6,834,123 | B2 | 12/2004 | Acharya |
| 6,839,079 | B2 | 1/2005 | Barlow |
| 6,842,777 | B1 | 1/2005 | Tuli |
| 6,847,468 | B2 | 1/2005 | Ferriere |
| 6,850,571 | B2 | 2/2005 | Tardif |
| 6,850,649 | B1 | 2/2005 | Malvar |
| 6,853,385 | B1 | 2/2005 | MacInnis |
| 6,868,083 | B2 | 3/2005 | Apostolopoulos |
| 6,898,583 | B1 | 5/2005 | Rising |
| 2003/0007666 | A1 * | 1/2003 | Stewartson et al. ......... 382/103 |
| 2003/0067387 | A1 | 4/2003 | Kwon et al. ................. 340/540 |
| 2003/0140135 | A1 * | 7/2003 | Okuyama et al. ........... 709/223 |
| 2003/0200336 | A1 * | 10/2003 | Pal et al. ..................... 709/246 |
| 2004/0255167 | A1 * | 12/2004 | Knight ........................ 713/201 |
| 2005/0076102 | A1 | 4/2005 | Chen et al. .................. 709/220 |
| 2005/0204015 | A1 | 9/2005 | Steinhart et al. |

OTHER PUBLICATIONS

Lamm, J.D., "Digital Packet Video Link—A VESA Proposed Standard," SID 03 Digest, 2003, pp. 1021-1023, ISSN/0003-0966X/03/3402-1021.

Skodras et al., "JPEG2000: The Upcoming Still Image Compression Standard," May 11, 2000, 14 pages.

Gary C. Kessler, "An Overview of TCP/IP Protocols and the Internet," InterNIC Document, Dec. 29, 2004, 42 pages.

Eric J. Balster, "Video Compression and Rate Control Methods Based on the Wavelet Transform," The Ohio State University, 2004, pp. 1-24.

Taubman et al., "Embedded Block Coding in JPEG2000," Feb. 23, 2001, pp. 1-8 of 36, Hewlett-Packard, Palo Alto CA.

Kulapala et al., "Comparison of Traffic and Quality Characteristics of Rate-Controlled Wavelet and DCT Video," Oct. 11, 2004, 6 pages, Arizona State University, Tempe AZ.

"Remote Desktop Protocol," Platform SDK: Terminal Services, Jun. 2005, 2 pages, Microsoft Corporation Web Site, Redmond WA.

"Matrox QID Pro" Jun. 2005, 3 pages, Matrox Graphics web site product specification, Matrox Electronic Systems Ltd, Dorval, Quebec, Canada.

Ian Griffiths, "A First Look at 3-D Support in Avalon," Jun. 2004, 11 pages, Microsoft Corporation Web Site, Redmond WA.

Wee et al., "Transcoding MPEG Video Streams in the Compressed Domain," HP Image and Data Compression Conference, Mar. 13, 1997, 10 pages, Hewlett-Packard, Palo Alto CA.

"Patent Cooperation Treaty: International Search Report," International Searching Authority, Apr. 22, 2008, 9 pages.

Supplementary European Search Report dated Nov. 18, 2009, issued in corresponding Application No. EP06826209.6, 12 pages.

* cited by examiner

MULTI-USER TERMINAL SERVICES ACCELERATOR

BACKGROUND OF THE INVENTION

1. Technical Field

The present invention relates generally to a multi-user host computer system, and relates more particularly to effective terminal services support for remote clients.

2. Discussion of Background Art

Developing efficient multi-user host computer systems is a significant objective for contemporary system designers and manufacturers.

Conventional computer systems may utilize a local display device to display output directly to one user. The local display device is typically positioned close to the computer system because of restrictions imposed by various physical connections that electrically couple the display device to the output of the computer system. Some computer systems may support a second display device that has similar proximity restrictions due to the physical connections.

Remote users require the additional flexibility of choosing an appropriate viewing location and network connection to the host system. For example, in a corporate environment, a business may wish to keep all of the host computers in a "Computer Room" that is a secure central location that has both physical security and environmental management such as air conditioning and power back-up systems. However, it is necessary for users to utilize the host computer systems from their offices and from desks located outside the "computer room."

The typical office environment today includes personal computers and increasingly more thin clients physically located at the users' locations. These personal computers and thin clients operate on a network having a centralized system for storage, file serving, file sharing, network management and various administrative services. Initially, systems centralized all of the disk storage associated with the computer system while users ran applications on their local desktops. More recently, recognizing the benefits of security, reduced cost of operation, and the general desire for centralizing control, personal computers and thin clients can operate as Remote Terminals (RTs) in Server Based Computing (SBC) solutions which run applications on a server.

The traditional approach for RTs in an SBC environment is for the host system to use some form of a server to client communication exchange such as Microsoft's Remote Display Protocol (RDP). RDP uses its own video driver on the server and uses the RDP protocol to construct the rendering information into network packets and sends them over the network to a client. The client receives rendering data and interprets the packets into corresponding Microsoft Win32 Graphics Device Interface (GDI) API calls. Support for redirecting the client keyboard and mouse commands to the server as well as managing local audio and local client drives is also included.

To enhance the communication between the host system and the clients, other systems have used the main CPU of the host system to improve the performance for RTs. This has been done both for thin clients and for traditional PCs as the remote clients. Such approaches have been effective for host systems that support only one user at a time. However, for multi-user systems, the approach of using the main CPU at the host to improve the performance for any one user has significant limitations. Computational resources such as main memory and CPU cycles that are used for optimizations for one user may reduce the ability to support the workload for additional users.

Efficiently supporting multiple users from a single host computer can reduce costs. In a typical office environment, seldom is everyone using their computer at the same time and similarly, seldom is any one user using all of the computing resources of their computer. So for example, a company with 100 offices may only need a system that supports 60 users at any one time. Even with that said, such a system could be designed to support all 100 users giving them enough computing throughput to give the appearance that they each had their own host computer.

With host computers ever increasing their performance by including multiple CPUs and CPUs that have multiple processor cores, the limitation of a single user to a single computer makes less and less economic sense. While some RTs may be locally connected over a Local Area Network (LAN) to a multi-user host system, other RTs will be connected over a Wide Area Network (WAN) where they have a lower performance network connection to the host system.

In distributed office environments with RTs at locations in different parts of the world, a centralized multi-user system may support different parts of the world during the different working hours for the respective time zones.

Server Based Computing, where the applications for users run on the server with only RT services supported at the users terminal is another way to more effectively allocate computing resources for multiple users. SBC allows the host system to dynamically allocate shared resources such as memory and CPU cycles to users that have the highest priority. SBC systems can employ techniques of Virtual Machines (VM), load balancing and other means to grant different users access to different levels of performance and resources based on a number of criteria. Different priority schemes can be used to allocate SBC resources. SBC can be used as a means to achieve higher data security, centralize the support for an organization, enhanced disaster recovery and business continuance, and to reduce data storage requirements across an organization.

However, an increased complexity may be required for a multi-user host computer to effectively manage, control and deliver rich application performance for the variety of RT devices that an organization may have. A solution is needed that allows a multi-user host system to more efficiently support numerous remote users with outstanding computing and display performance.

SUMMARY

The present invention provides an efficient architecture for a host or server system in a multi-user computer system including one or more Remote Terminals capable of interactive graphics and video. The host computer system generally manages applications and performs server based computing. Each RT has its own keyboard, mouse and display and possibly other peripheral devices. The RTs provide individual users with access to the applications on the server as well as a rich graphical user interface.

In the first preferred embodiment, the host system includes an auxiliary processor referred to as a Terminal Services Accelerator (TSA) that offloads the computational tasks of managing a remote graphics protocol for each RT. The TSA allows a multi-user host computer to economically scale to adaptively support numerous and different RTs that may be networked over a variety of different bandwidth solutions. The TSA may include processing elements in the form of configurable processors, Digital Signal Processors (DSPs) or hardware blocks to best perform the offload from the host, and further, do an improved job of supporting a variety of terminals. The offload may include encapsulation of graphics commands into network packets, encoding of different blocks of data so that the communication channel may be more efficiently used, and tracking the cached data for each RT. There is likely to be a local graphics processor in the host system for supporting a local terminal, but it is not part of the support system for the RTs. The TSA can process local graphics to provide remote KVM management capabilities.

In a second preferred embodiment, a host computer utilizes a combination of software, a graphics processor, and data encoding to support multiple RTs by creating a virtual display environment for each RT so that only the minimum commands or data for it need to be communicated. The most common methods for communication with the RT include sending an encapsulated graphics command or sending encoded sub-frame data. The software to manage the RTs can run on either the host CPU or on a TSA as in the first embodiment or on a combination of the two. The selective updates for each RT can be coordinated in software or with the assistance of hardware in the graphics processor. The graphics processor may follow the proposed VESA Digital Packet Video Link (DPVL) standard or an improved method using status bits or signatures for the sub frames. In other enhancements, PCI express or another bus is used instead of DVI for the output data, additional data encoding is performed either within the graphics processor or with an encoder attached to the graphics processor, and the software utilizes a single virtual graphics processor for multi-user support.

Each embodiment may further offload from the host CPU through using tracking software along with the TSA to intercept functions such as video playback. Instead of having the host CPU perform the video decode locally and supply the bitmaps for transport to the RTs, the TSA can intercept the video stream prior to decode by the CPU and may communicate the native video stream or a modified version, such as a transcoded or transrated version, to the target RT. The communication to the RTs may occur using other private channels in addition to the standard RDP channels but still managed within the RDP protocol In the host system for each embodiment, after the data is encapsulated or encoded, a network processor, or CPU working in conjunction with a simpler network controller, transmits the graphics packet over wired and/or wireless network(s) to an RT. Each RT system decodes the graphics packet intended for its display, manages the frame updates and performs the necessary processing for the display screen. Other features, such as masking packets lost in network transmission, are managed by the remote display system(s). When there are no new frame updates, the remote display controller refreshes the display screen with the data from the prior frame.

The system may feed back network information from the various wired and wireless network connections to the host system CPU, TSA and data encoding systems. The host system uses the network information to affect the various processing steps of producing RT updates and, based on the network feedback, can vary the frame rate and data encoding for different RTs. Additionally, for systems that include noisy transmission channels as part of the network, the encoding step may be combined with forward error correction protection in order to prepare the transmit data for the characteristics of the transmission channel. The combination of these steps maintains an optimal frame rate with low latency for each of the RTs. The TSA may be implemented as a separate subsystem or combined with other offload and acceleration processing such as the network processor, security processor, XML accelerator, iSCSI processor or any combination of these.

Therefore, for at least the foregoing reasons, the present invention effectively implements a flexible multi-user RT system that utilizes various heterogeneous components to facilitate system interoperability and functionality. The present invention thus efficiently implements an enhanced multi-user RT system.

DETAILED DESCRIPTION OF THE PREFERRED EMBODIMENT

The present invention relates to an improvement in multi-user Remote Terminal (RT) computer systems. While the described embodiments relate to multi-user RT computer systems, the same principles and features could be equally applied to other types single user systems and other types of thin clients.

Figure 1:
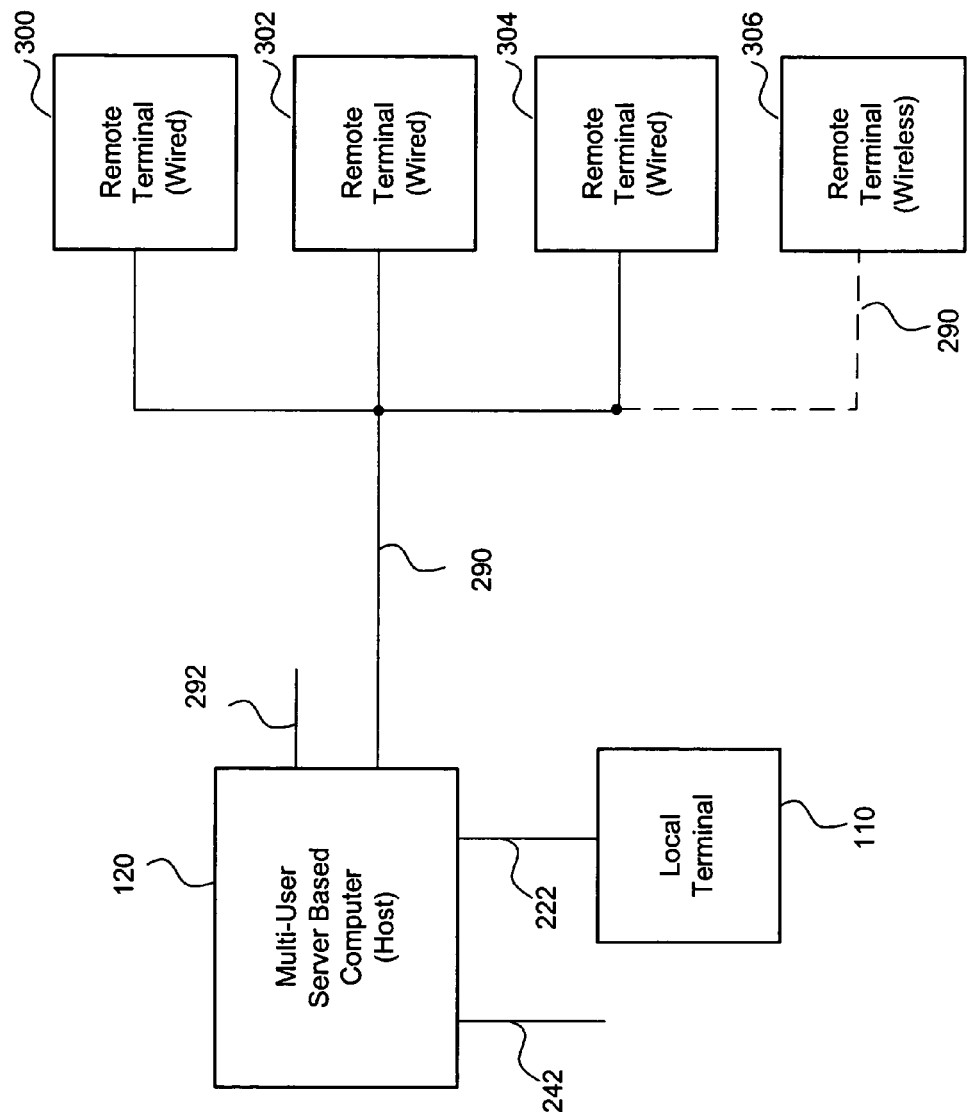
FIG. 1 is a block diagram of a multi-user computer system including one or more host computers, a network, and multiple Remote Terminals.

Referring to FIG. 1, the invention provides an efficient architecture for a multi-user computer system 100. A Multi-User server based computer 120, referred to as the "Host 120," processes applications for multiple users each utilizing some form of a Remote Terminal. A local terminal 110 is included primarily for a single user or for administrative tasks, and the Host 120 produces display update network streams over wired network(s) 290 to each of RTs 300, 302, 304, etc., or over a wireless network 290 to display(s) 306. Users at the RTs are able to time-share the host computer 120 as if it were their own local computer and have complete support for all types of graphics, text and video content with the same type of user experience that could be achieved on a local computer. Additional connections 292 may be network connections to a WAN, storage subsystem, other Hosts or a variety of other data center connections and may take the form of GigE, 10G Ethernet, iSCSI, Fiber Channel (FC), Fiber Channel IP (FCIP) or another electrical or optical connection. Connection 242 may connect other data or video sources to the host system 120.

Throughout this document, "Host" may refer to Host 120, Host 200 or Host 400 which can be configured in a variety of ways to support multi-user server based computing. Multiple Hosts 120 may be clustered together to form a computing resource that can be dynamically shared. Within each Host 120, multiple computer hosts 200 may be ganged together in the form of blades in a rack connected over a backplane or in another multiprocessor configuration. A variety of multi-user Operating Systems (OSs) or software that virtualizes a single user OS may be deployed on one or more of the processor blades or motherboards. An operating system such as Citrix or Windows Server is designed as a multi-user OS. Windows XP, though not specifically designed for multiple users, can be used in such a configuration with the help of either lower level virtualization software, such as VMWARE or Xen Source, or another means to perform user switching so quickly as to appear as a multi-user OS. Different management controls may allow RTs and programs to statically or dynamically be moved from processor to processor. Load balancing may be performed by the OS for each processor or the system may perform load balancing across multiple processors.

Figure 2:
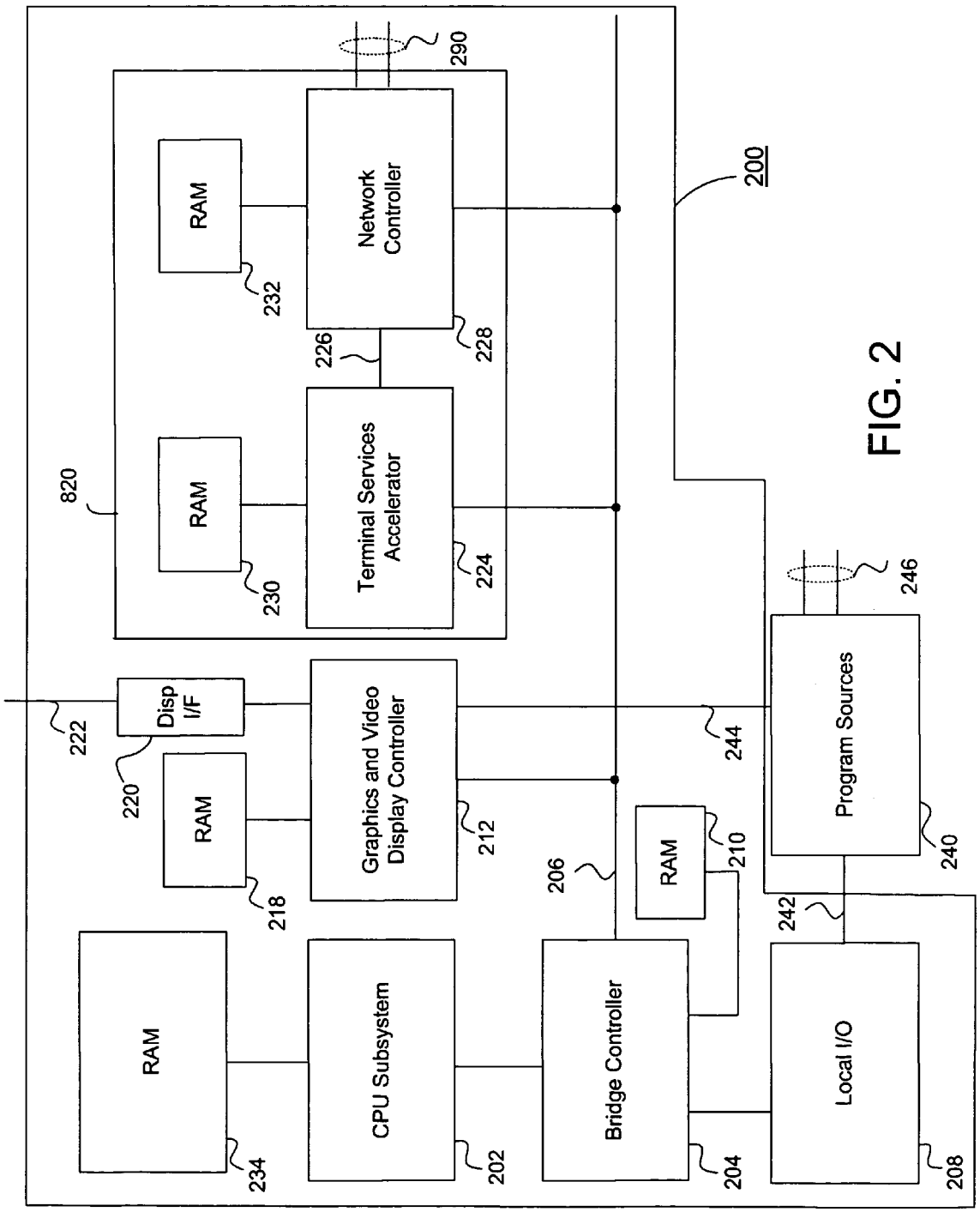
FIG. 2 is a block diagram of a multi-user RT system host computer having a Terminal Services Accelerator in accordance with one embodiment of the invention.

FIG. 2 is a block diagram of one blade 200 of a server system where each blade may be a host computer 120 by itself or multiple blades can be racked together to create a more capable host computer 120. Either a single blade (motherboard) system 200 or a multiple blades 200 may be used for a multi-user system 100 in accordance with an embodiment of the invention. The more blades and CPUs that a host system 120 has the more users can be simultaneously supported. The basic components of host computer 200 preferably include, but are not limited to, a CPU subsystem 202, a bus bridge-controller 204, a main system bus 206 such as PCI express, local I/O 208, main RAM 210, and a graphics and display controller 212 and possibly its own memory 218. The graphics and display controller 212 may have an interface 220 that allows for local connection 222 to a local terminal 110. Program sources and multimedia bitstreams may enter host computer 200 through either one of the network interfaces 290 or via one of the program sources 240 with I/O paths 246. Network controller 228 also processes the display update stream and provides the network communication over one or more network connections 290 to the various RTs 300-306, etc. These network connections can be wired or wireless.

In other configurations, more than one CPU Subsystem 202 may share one or more of the devices such as graphics and video display controller 212 and Terminal Services Accelerator 224. Other systems may be partitioned where network controllers 228 may be shared by multiple host systems 200. System bus 206 may connect to a backplane bus for connecting between multiple blades in a system. Path 226 may share backplane bus 206 or may have an additional bus between systems. More than one network controller 228 may be included in a system where one is used for a connection 290 to multiple remote terminals and another network controller (not shown) performs infrastructure network connections to other blades, other server systems or other data center equipment such as storage systems. Each CPU Subsystem 202 may include multiple processor cores where each core may simultaneously execute more than one thread.

Host computer 200 also preferably includes a Terminal Services Accelerator (TSA) 224 that is connected to the main system bus 206 and may have an output path 226 to network controller 228. The TSA 224 may include a dedicated RAM 230 or may share main system RAM 210, graphics and display controller RAM 218 or network controller RAM 232. The main RAM 210 may be associated more closely with the CPU subsystem 202 as shown at RAM 234. Alternatively the RAM 218 associated with the graphics and display controller 212 may be unnecessary as the host system 200 may share a main RAM 210.

The function of TSA 224 is to offload the main CPU 202 from some of the management for each of the RTs and to accelerate some of the offloaded processing so that each RT has improved display support. The types of offload and acceleration support include encapsulating graphics operations into remote graphics commands, assisting in determining what capabilities and bitmaps are cached at each RT to determine which graphics commands are best suited, encoding and encapsulating bitmaps that need to be transferred to RTs as well as best managing multimedia bitstreams.

Additional functions such as inspection and encapsulation of eXtensible Markup Language (XML) traffic, Simple Object Access Protocol (SOAP), HTTP traffic, Java Virtual Machine (JVM) and other traffic associated with Internet based communication may also be supported. The host system along with the TSA 224 can allow RTs to effectively perform remote access to the complete Internet while performing any desired anti-spam, anti-virus, content filtering, access restriction enforcement or other packet filtering based algorithms. Such additional functions may be particularly useful for supporting RT Internet browsing where the host is a proxy for the Internet accesses. Though there may be some redundancy in a system, this method may provide more specific user controls than the Internet security appliances that are utilized between the host system and the WAN.

A special browser on the RT may use other enhancements for Internet-based traffic which may include reformatting or recoding Internet based content based on the RT display device and the execution capabilities within the RT. For example, if the RT device is a cellular phone or Personal Digital Assistant (PDA) with a limited screen resolution, the TSA 224 can filter down high resolution content into lower resolution images for faster and more appropriate display. The TSA 224 may run other more intelligent web page interpretation algorithms to perform functions like removing banner advertisements and other extraneous information so that the core information may be sent to the cellular phone. Other types of web content, such as those utilizing Active-X controls, Macromedia Flash or other run time programs may not be compatible with devices such as a phone or PDA. The TSA 224 can act as an intermediary and transfer display data post-Active-X controls to an awaiting PDA. Application layer Regular Expression (RegEx) content processing may also be performed. Recoding may also be performed to increase security for clients. Whereas XML and SOAP may be subject to hijacking and other forms of passing of viruses, TSA 224 could recode XML and SOAP into a safe display format so that an RT client would not be subject to such risks.

Multimedia bitstreams may include a video stream that is already in a compressed format and is stored local to host system 200 or is being received via one of the systems network interfaces 290 or program source interfaces 246. In some configurations, the multimedia bitstream will already be in a format that is compatible with the intended RT. In such a case, the TSA 224 will encapsulate the bitstream into the appropriate packet format for transmission to the RT. Encapsulation may include adding header information, such as the origin for the video display window, or modifying packet organization, such as converting a transport stream into a program stream with different packet sizes.

In many cases the multimedia bitstream will not be in a format readily handled by the target RT or not in a format appropriate for the network connection. In such cases, the TSA 224 performs a more complex step of decoding and re-encoding, transcoding or transrating the multimedia bitstream. For example, the incoming multimedia bitstream may be an encoded HDTV MPEG-2 stream. If the window size at the RT is set for a small 320×240 window, it may make sense to conserve network bandwidth and have the TSA 224 transcode and transrate the video into a lower bitrate representing the desired display window size. Similarly, if the incoming video was in a format that the RT was not capable of decoding, the TSA 224 may transcode the video into a compatible format. Even if the format is compatible, other incompatibilities such as the Digital Rights Management (DRM) encryption scheme may exist. The TSA 224 can also translate from one DRM or encryption scheme to a suitable scheme for the target RT.

Microsoft's Remote Desktop Protocol (RDP) provides significantly less efficient processing for compressed video bitstreams. With RDP, the drivers within the host system detect and decode the bitstream into a Device Independent Bitmap (DIB). The DIB is then translated into RDP transfer commands and the DIB format data is attempted to be transferred over the network to the RT. In most cases, only a couple of frames of DIB data make it through to the RT for display. Thus, there is inefficiency in the host CPU performing decoding as well as in sending the decoded data over the network in a less efficient format. Other RDP based graphics operations make use of DIBs as well.

Conventional graphics bitmaps, such as those from a website, also need to be transferred from the host system 200 to an RT. The TSA 224 can perform various levels of encoding for conventional graphics bitmaps such as DIBs. The encoding for graphics bitmaps may be lossless or lossy with a goal of providing visually indistinguishable representations of the original graphics quality. A simplified software interface for the TSA 224 may include just interfacing with the host CPU through the RDP API, while a more aggressive implementation would allow TSA 224 access to the underlying DirectX driver framework. The encoded DIB transfers and the special compressed video domain transfers are not part of a standard RDP implementation. Therefore these transfers may be piggybacked into an existing RDP transfer format, operate as some type of private RDP extension or operate outside of the RDP framework.

Some versions of the host operating system and RDP need to satisfy additional security requirements for the RDP protocol. The RDP client may be required to exchange a key with the host to make use of the encrypted packets. Since TSA 224 is intercepting the RDP client packets, the TSA 224 may include appropriate acceleration and offloading for key exchange and decryption for communicating with the host processor. In addition, in order to maintain the security of the system, the TSA 224 and Network Controller 228 will assure that all communication with the RTs is appropriately encrypted.

Figure 3:
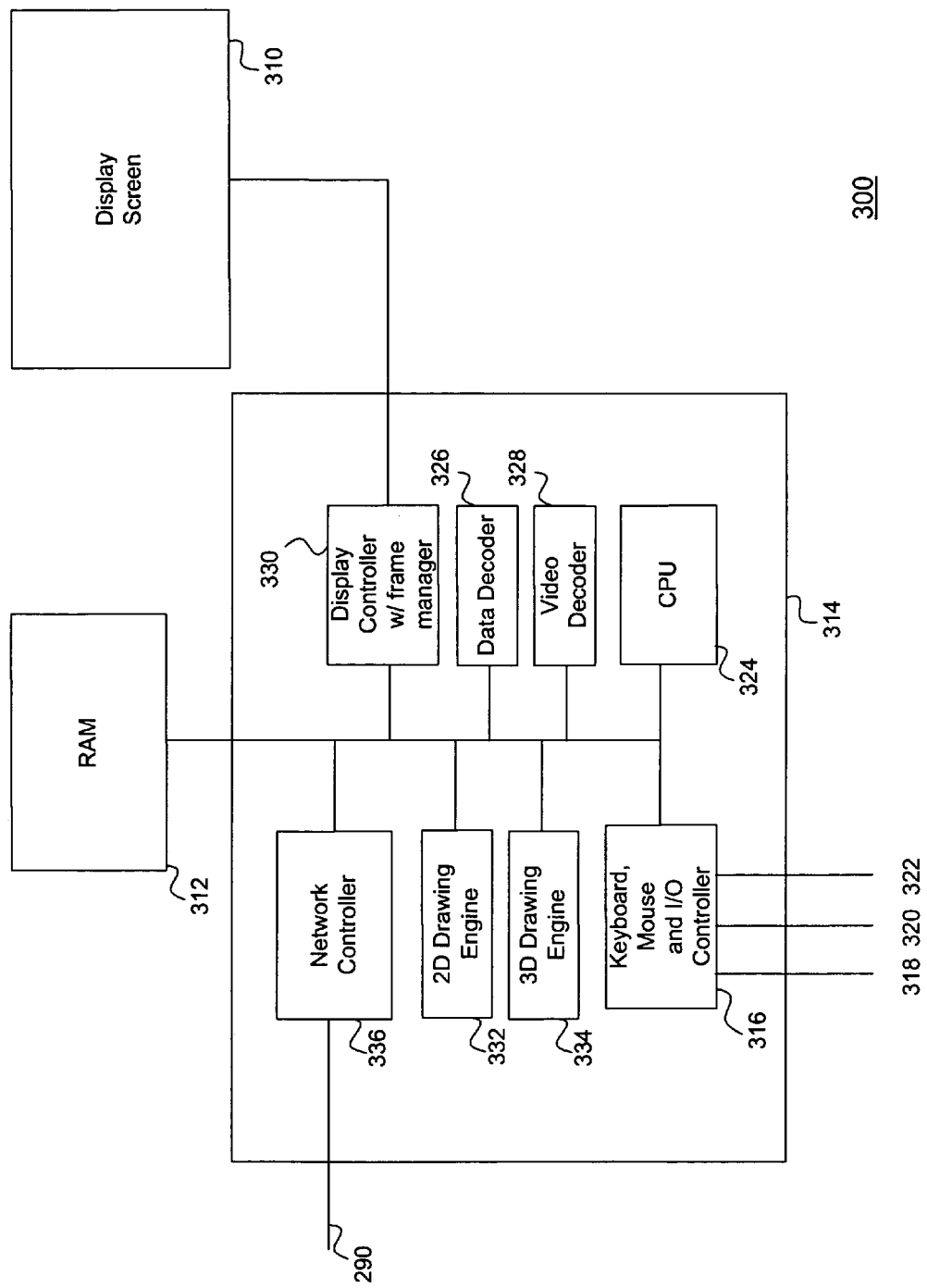
FIG. 3 shows an RT which cooperates with the host computer of FIG. 2.

FIG. 3 is a block diagram of a Remote Terminal (RT) 300, in accordance with one embodiment of the invention, which preferably includes, but is not limited to, a display screen 310, a local RAM 312, and a remote terminal system controller 314. The remote terminal system controller 314 includes a keyboard, mouse and I/O control subsystem 316 which has corresponding connections for a mouse 318, keyboard 320 and other miscellaneous devices 322 such as speakers for reproducing audio or a Universal Serial Bus (USB) connection which can support a variety of devices. Other integrated or peripheral connections for supporting user authentication via secure means, including biometrics or security cards, may also be included. The connections can be dedicated single purpose such as a PS/2 style keyboard or mouse connection, or more general purpose such as USB. In other embodiments the I/O could include a game controller, a local wireless connection, an IR connection or no connection at all. Remote Terminal system 300 may also include other peripheral devices such as a DVD drive.

Some embodiments of the invention do not require any inputs at the remote terminal system 300. An example of such a system is a retail store or an electronic billboard where different displays are available at different locations and can show variety of informative and entertaining information. Each display can be operated independently and can be updated based on a variety of factors. A similar secure system could also include some displays that accept touch screen inputs, such as an information kiosk or Automated Teller Machine (ATM) at a bank. Other secure systems, such as a game machine for a casino, could also be based on this type of RT.

Network controller 336 supports secure protocols on the network path 290 where the networks supported could be wired or wireless and the data traveling over the network can be encrypted via a key exchange. The networks supported for each remote display system 300 need to be supported by the FIG. 2 network controller 228 either directly or through some type of network bridging. A common network example is Ethernet, such as CAT 5 wiring running some type of Ethernet, preferably gigabit Ethernet, where the I/O control path may use an Ethernet supported protocol such as standard Transport Control Protocol and Internet Protocol (TCP/IP) or some form of lightweight handshaking in combination with UDP transmissions. Industry efforts such as Real-time Streaming Protocol (RTSP) and Real-Time Transfer Protocol (RTP) along with a Real-Time Control Protocol (RTCP) can be used to enhance packet transfers and can be further enhanced by adding re-transmit protocols. Other newer efforts around using Quality of Service (QoS) efforts such as layer 3 DiffServ Code Points (DSCP), the WMM protocol as part of Digital Living Network Alliance (DLNA), Microsoft Qwave, uPnP, QoS and 802.1P are also enhanced ways to use the existing network standards.

In addition to the packets for supporting the I/O devices, the network carries the encapsulated and encoded display commands and data required for the display. The CPU 324 coordinates with the network controller 336, 2D drawing engine 332, 3D drawing engine 334, data decoder 326, video decoder 328 and display controller 330 to support all types of visual data representations that may be rendered at the host computer and display them locally on display screen 310. There is no requirement that an RT include any particular combination of the display processing blocks. An extra thin RT may include as little as just a display controller 330 with a CPU doing the display processing though having at least one type of decoder or drawing engine is more likely.

The RT can be first initialized either by booting out of a local FLASH memory (not shown) with additional information being provided over the network by the host computer 200. During the initialization sequence for the RT, the connection between the RT system controller 314 and the display screen 310 may be used in a reverse direction or bidirectional mode utilizing standards such as Display Data Channel (DDC) Interface, Extended Display Identification Data (EDID) and other extensions to identify the display monitor capabilities. A USB connection via Keyboard, Mouse and I/O controller 316 may also be used in the connection to the display screen 310. The information such as the available resolutions and controls are then processed by the CPU 324. System 300 may implement a protocol such as uPnP or another discovery mechanism where it is able to communicate with the host 200. During that initialization communication, CPU 324 may provide the RT information, including the display monitor information, to the host 200 so that each RT can be instantiated at the host side.

The initial display screen may come from either the FLASH memory or from the host computer 200. Following a first full frame of display data, the host computer 200 need only send partial frame information over the network 290 as part of the display update network stream. If none of the pixels of a display are changed from the prior frame, the display controller 330 can refresh the display screen 310 with the prior frame contents from the local RAM storage 312.

Display updates are sent via the network stream, and may consist of encapsulated 2D drawing commands, 3D drawing commands, encoded display data or encoded video data. The network controller 326 receives the network display stream and the CPU 324 determines from the encapsulation header which of the functional units 332, 334, 326 and 328 are required for that packet. The functional units perform the necessary processing steps to draw or decode the image data and update the appropriate area of RAM 312 with the new image. During the next refresh cycle, the display controller 330 will use this updated frame for display screen 310.

The display controller 330 transfers a representation of the current image frame from the RAM 312 to the display 310. Typically, the image will be stored in RAM 312 in a format ready for display, but in systems where RAM cost is an issue, the image or portions of the image can be stored in the encoded format. External RAM 312 may be replaced by large buffers within the remote terminal system controller 314. Display controller 330 may also be able to combine two or more display surfaces stored in RAM 312 to composite an output image for display by. Different blending operations may be performed along with the compositing.

CPU 324 communicates with TSA 224 to best set up and manage the overall display operations for the RT. Initial setup may include enumerating the types of functions supported in the RT system controller 314, specifications of display screen 310, amount of RAM 312 available for buffering and caching data, command set supported by the 2D drawing engine 332, command set supported by the 3D drawing engine 334, formats supported by the data decoder 326, formats supported by video decoder 328 and the capabilities of display controller 330. Other management optimizations at run time include managing and caching display bitmaps in RAM 312 so they do not need to be resent.

Figure 4:
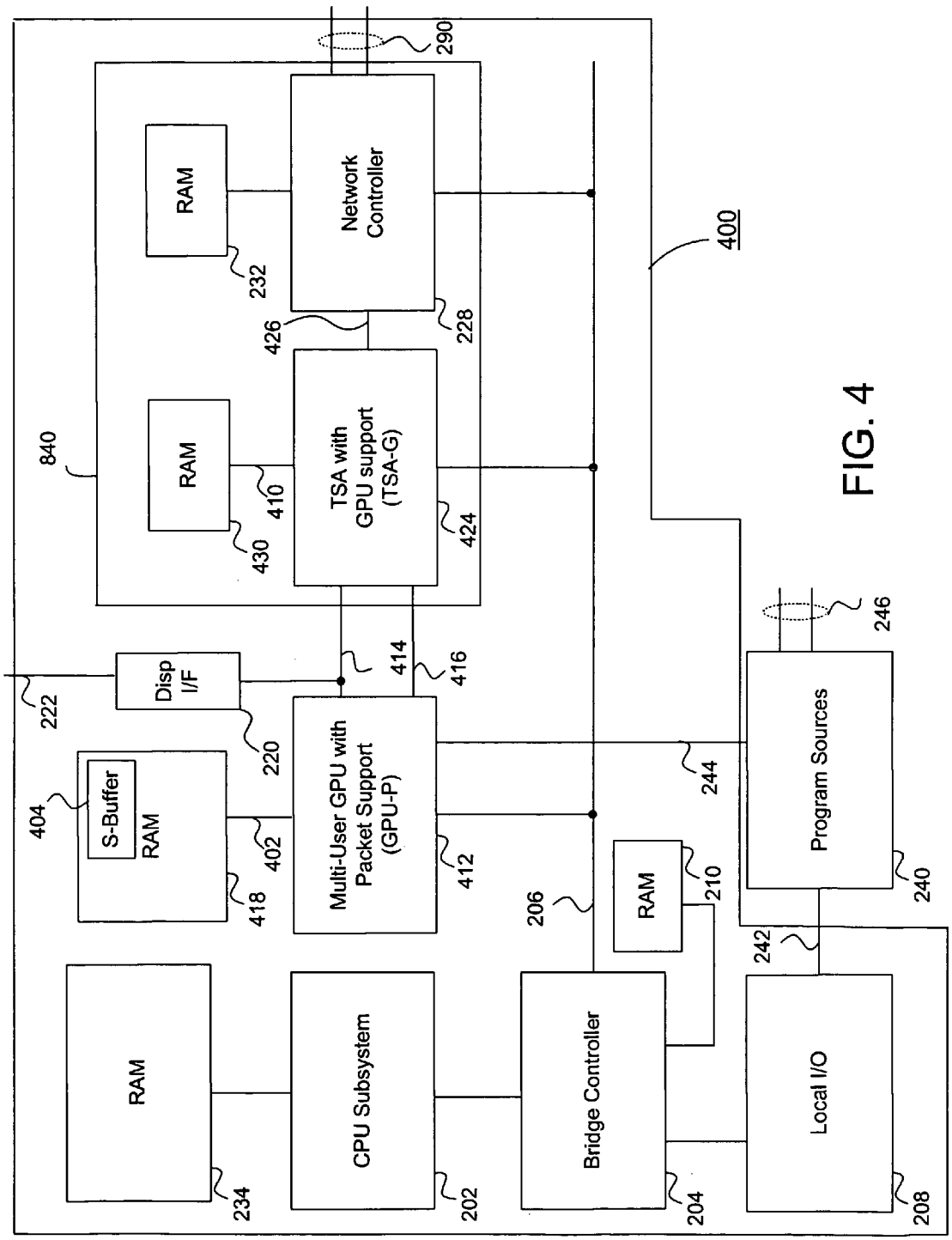
FIG. 4 is a block diagram of a multi-user RT system host computer having a Terminal Services Accelerator with a Graphics Processor Unit in accordance with a second embodiment of the invention.

FIG. 4 illustrates a second preferred embodiment of a multi-user host system 400 with several changes from host system 200. First, the graphics and video display controller 212 is replaced with a more capable Graphics Processor Unit (GPU-P) 412 that includes support for selective display updates via Packets and may follow some or all of the proposed VESA Digital Packet Video Link (DPVL) standard. Second, the TSA 224 is replaced with a TSA-G 424 that is enhanced to more directly support the packet display updates from GPU-P 412 either via system bus 206 or preferably supports input paths 414 and 416 which may be Serial Digital Video Output SDV01 and SDV02 or generalized ports having different bus widths, signaling protocols and frequencies. Examples include Digital Video Output (DVO), Digital Visual Interface (DVI), High Definition Multimedia Interface (HDMI), Display Port or other Low Voltage Differential Signaling (LVDS), Transition Minimized Differential Signaling (TMDS), PCI Express or another scheme. The display output paths may run at sufficient speed to output multiple frames of video at high refresh rates where frames may be selective update rectangles corresponding to more than one target RT. Similar to TSA 224, TSA-G 424 may be connected to network controller 228 over a dedicated link 426, via the main system bus 206 or more closely integrated via a System on Chip (SOC) implementation.

In addition to performing traditional graphics processing, the GPU-P 412 produces the selective updates which indicate which portions of the display have changed. The selective updates can take up the form of rectangles or tiles that are output either over video output path 414 or 416 or over the main system bus 206. The rectangle updates include a packet header to indicate the origin, size and format of the window. The origin can be used to indicate which RT is the destination. Tiles can also be used and may be standardized to one or more fixed sizes such that the header may need less information to describe the tile. Other information, such as if and how the rectangle or tile should be scaled at the RT, may also be included in the header. Other forms of selective updates include support for BitBlt, Area Fill and Pattern Fill where instead of sending a large block of data, a minimal amount of data is sent along with the command parameters for the operation to be performed at the RT. Other headers support updates in the forms of Video Stream, Genlock, scaled video stream, Gamma Table and Frame Buffer Control. Other enhanced and complex commands can also be put into the form of a selective update to an RT. The proposed DPVL specification details one possible implementation for the selective updates along with their headers.

One GPU-P 412 is effectively virtualized to be used by the system for all of the RTs 300 by organizing RAM 418 into various surfaces each containing display data for multiple RTs. The GPU-P 412's 2D, 3D and video graphics processors (not shown) are preferably utilized to achieve high graphics and video performance. The graphics processing units may include 2D graphics, 3D graphics, video encoding, video decoding, scaling, video processing and other advanced pixel processing. The GPU-P 412's display controllers may also perform functions such as blending and keying of video and graphics data, as well as overall screen refresh operations. In addition to the RAM 418 used for the primary and secondary display surfaces, there is sufficient off-screen memory to support various 3D and video operations. As an alternative to the DPVL method of managing selective updates, there may a Selective update buffer memory (S-Buffer) 404 within RAM 418. In one embodiment S-Buffer 404 stores status bits, a signature or both status bits and a signature which correspond to each tile for each virtual display. In another embodiment, S-Buffer 404 stores the tiles themselves, with or without header, status bit and signature information, where the tiles are arranged to be output for selective updates.

The graphics engines and the display controller will typically composite a complete display image that corresponds to the primary surface for each RT display. The RAM 418 will effectively contain an array of the display frames for all of the RTs. DPVL allows for a virtual display of up to 64K×64K where the primary application is for multiple monitor support. In this application, the RT displays can be mapped into the 64K×64K array. Because this application involves multiple independent RTs, the GPU-P 412 may add different security features to secure the different display areas and prevent one user from gaining access to another user's frame buffer. The system would preferably include hardware locks that prevent unauthorized access to protected portions of the display memory for both security and reliability concerns.

Figure 5:
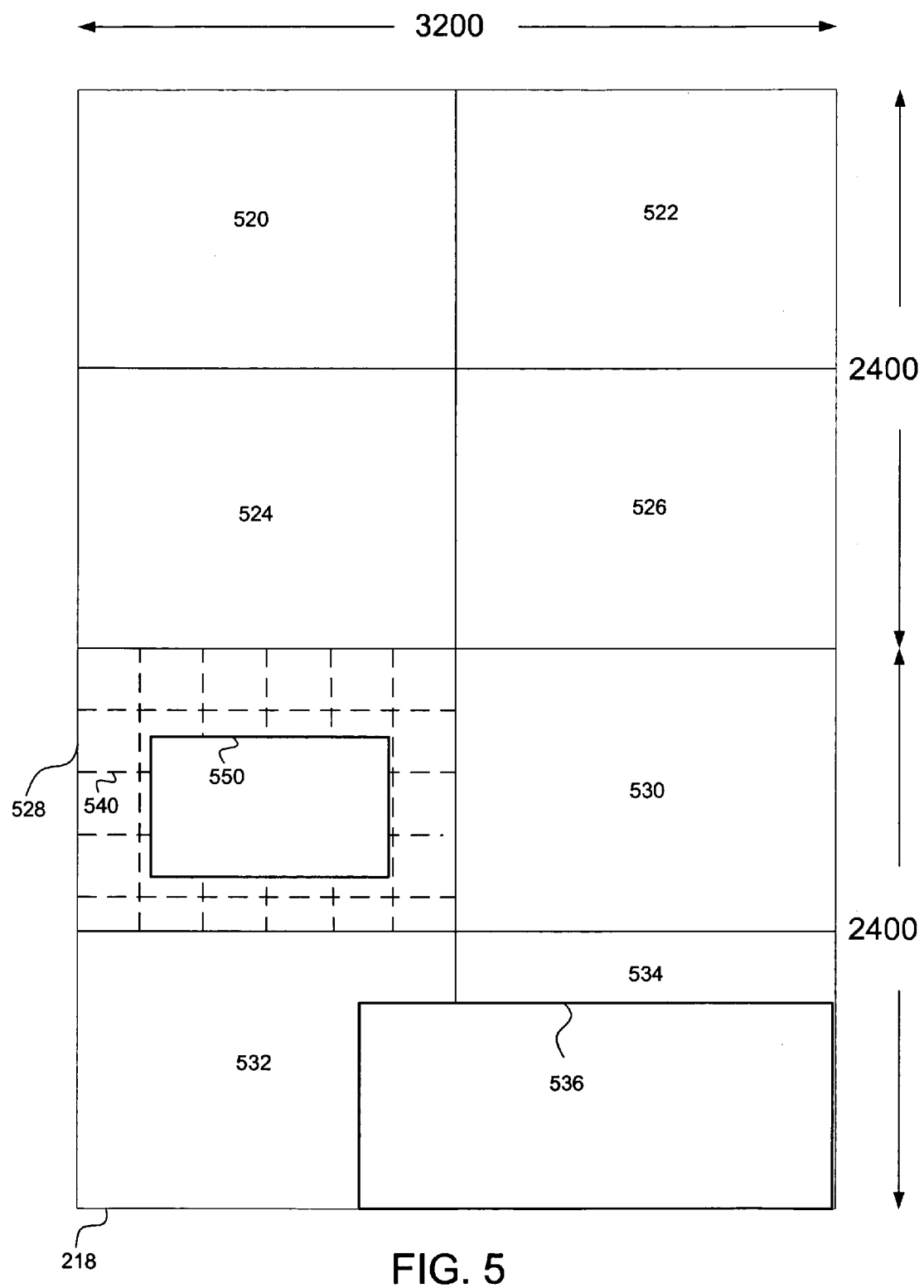
FIG. 5 represents a memory organized into eight display areas, one of which includes a display window and two of which are used to support one large display.

FIG. 5 shows an example configuration of FIG. 4 memory 418 where the virtual display space is set to 3200 pixels horizontally and 4800 pixels vertically. Memory 418 is divided into eight 1600×1200 display areas labeled 520, 522, 524, 526, 528, 530, 532 and 534. A typical high quality display mode would be configured for a bit depth of 24 bits per pixel, though often the configuration may utilize 32 bits per pixel as organized in RAM 418 for easier alignment and potential use of the extra eight bits for other purposes when the display is accessed by the graphics and video processors. The illustration of the tiled memory is conceptual in nature as a view from the GPU-P 412. The actual RAM addressing will also relate to the memory page sizes and other considerations.

FIG. 5 in display area 528 further illustrates a display update rectangle 550. The dashed lines 540 of the 1600×1200 display correspond to even coarser block boundaries of 256× 256 pixels referred to as precincts. As is apparent from display window 550 the alignment of the display window boundaries does not necessarily line up with the precinct boundaries. This is a typical situation as a user will arbitrarily size and position a window on a display screen. In order to support remote screen updates that do not require the entire frame to be updated, each of the precincts that are affected by the display window 550 needs to be updated. Furthermore, the data type within the display window 550 and the surrounding display pixels may be of completely different types and not correlated. As such, the precinct based encoding algorithm, if it is lossy, needs to assure that there are no visual artifacts associated with either the edges of the precincts or with the borders of the display window 550. The actual encoding process may occur on blocks that are smaller, such as 8×8 or 16×16, than the precincts. Therefore, a preferred embodiment uses a deterministic encoding algorithm, where the same result is produced for a set of pixels regardless of the surrounding pixels, and no artifacts will be produced by the arbitrary alignment of the window.

The block boundaries for the encoding scheme are also a consideration with respect to the tiles. For example, an encoding scheme may require block boundaries in multiples of 8 pixels. If the source tile is not a multiple of 8 it will need to be padded with the surrounding data. In another case, it is often preferred to orient the block boundaries to the screen, not to the particular user-placed rectangle or tile. If a user manipulates a window that is 80×80 pixels, even though it theoretically could have been placed to use a minimum of ten 8×8 blocks in each of the horizontal and vertical directions (one hundred blocks total), it is more likely to span eleven blocks in each direction (121 blocks). The rectangle update and any proceeding encoding of the rectangle will therefore encode 88×88 (121 blocks) where some of the surrounding pixels are required for padding. Though the DVPL specification does not consider rectangle encoding as part of the selective update scheme, there may be other granularity limitations in DVPL that result in suitable sized rectangle boundaries of modulo 8 pixels using the DVPL CRTC output mechanism.

RTs with displays of different sizes can also be supported. In one example, the GPU-P 412 can support an arbitrary number of arbitrarily sized displays. In another example, it may be simpler to support smaller displays as sub-windows or a larger display as an overlay window spanning more than one display area. As delineated by rectangle 536, a 1920×1080 window would need to use both the 532 and 534 areas. While this wastes area, it may be simpler to implement than creating custom sizes for each display. Because of the selective rectangle update mechanism of GPU-P 412, only the relevant areas of the screen will ever be transmitted. While DVPL dynamically controls the CRTC control registers to manage the selective updates, other more flexible mechanisms such as an S-Buffer can be implemented that require less processor intervention.

A more flexible system may also break the concept of the DVPL rectangle into more regular sized entities such as tiles. There is trade-off in the efficiency of header information with arbitrary rectangle sizes versus potentially simpler headers using less flexible tile sizes though more screen data. In one preferred embodiment, the tiles may be dynamically set to any multiple of the block size where the block size is the smallest entity for the data encoding algorithm. The blocks may be oriented either to the source image or to fixed block positions of the screen. The size of the tile would be included in the header information.

An area of memory, such as 530, may be designated as an S-Buffer 404 for managing the selective updates. In one embodiment, the S-Buffer includes status bits that correspond to the tiles of display frames 520, 522, 524 and 526 where the status bits indicate if a tile requires selective updating. The S-Buffer 404 may also store a signature for each of the tiles which is then used in determining the need for selective updates. In another embodiment, the tiles from frames 520, 522, 524 and 526 which require selective updates are copied to memory area 530 and queued for selective update output. The queued tiles may include various header, status and signature information.

Figure 6:
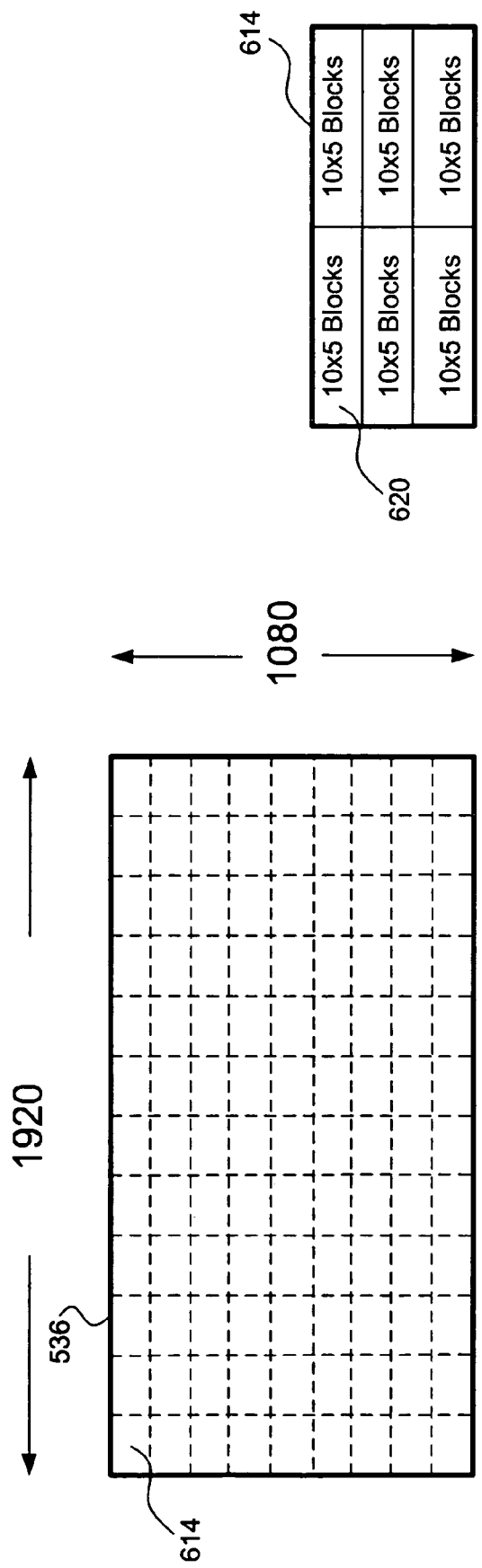
FIG. 6A shows a more detailed view of FIG. 5 display map 536.
FIG. 6B shows a FIG. 6A rectangle sub-divided into tiles.

FIG. 6A shows a more detailed view of FIG. 5 display map 536 which has a High Definition Television (HDTV) resolution of 1920×1080 referred to as 1080P. In FIG. 6A e fixed size rectangles 614 are oriented with the screen position boundaries. Each rectangle is 160 pixels across and 120 pixels high. There are 12 rectangles per row (12×160=1920) and 9 rectangles per column (9×120=1080). A system may use these rectangles as the tiles that form the basis for selective updates. In FIG. 6B another system further divides the rectangles 614 into tiles 620 containing 80×40 pixels, and a system may choose these smaller tiles as the basis for selective updates. A more flexible system may utilize both the larger rectangles 614 made up of the six tiles 620 and the tiles themselves and use the header information to delineate which type is being output at any given time.

In both cases, the blocks that form the basis of an encoding algorithm fit within the tile or rectangle. Assuming 8×8 blocks, each tile has a 10×5 configuration of blocks and each rectangle has a 20×15 configuration of blocks. A system that utilizes both larger rectangles and smaller triangles may use different mechanisms for each in determining the selective update requirements. In one preferred embodiment, the large rectangles may have associated status bits indicating whether they have changed or not and the smaller tiles may utilize a signature for making such a determination. The status bits and signatures may be managed with S-Buffers as described below.

The GPU-P 412 may integrate the processing to perform the selective encoding of the tiles directly, or each tile may be checked using the selective update process and output to the TSA-G 424 and will include an appropriate header. The header will be processed by the TSA-G 424 and, based on the fields within the header, the TSA-G 424 will know which RT and where on the display screen the tile is intended for. Where appropriate, the TSA-G 424 will encode the tile into a compressed format, adjust any required header information and provide the tile and header for further network processing.

The GPU-P 412 and TSA-G 424 may partition the selective update process differently. In some cases the GPU-P 412 can perform the complete management and will only send the tiles that need updating to the TSA-G 424. In other cases, the TSA-G 424 is required to perform further filtering of the slices to determine which slices truly require updates. Within the GPU-P 412 the selective update mechanism can be hardwired or require CPU intervention and the hardware may be implemented across both the drawing engine and a selective update refresh engine. The encoding of the tiles may also be performed either in the GPU-P 412 or in the TSA-G 424. The GPU-P 412 may also output the graphics drawing commands for the RT to the TSA-G 424 over the digital video bus, or the software drivers may provide the commands directly to the TSA-G 424.

For the selective tile updates, in a first embodiment, an S-Buffer is used where the GPU-P 412 has a drawing engine that manages status bits for each tile and a selective update refresh engine that monitors the status bits as it manages the selective display updates for each tile. Like a Z-Buffer used in 3D graphics, the S-Buffer may be implemented as a separate memory plane of data. As with a Z-Buffer, the hardware drawing operations of an enhanced GPU-P 412 can update the S-Buffer status bits without additional commands. The status bits are then used by selective update hardware to determine which of the tiles needs to be updated at the RT. Like the refresh cycle of a display controller, the selective update hardware may periodically traverse the S-Buffer and read the status bits. Based on the state of the status bits, the selective update hardware will either pass over a tile that does not need to be updated or it will read the tile for selective update, output the tile along with the header information and update the status bits accordingly. In a less efficient implementation, the GPU-P can use more traditional graphics drawing operations to generate an S-Buffer.

In another preferred embodiment not requiring specific S-Buffer hardware, the GPU-P 412 can manage a selective update buffer of concatenated tiles that need updating. The selective update buffer may be constructed in a separate memory area. Every time that the GPU-P performs an operation that changes a tile, it will then copy that tile to the selective update buffer. The header information can be stored at the start of each tile and the tiles can be packed together. The display controller is set up to use the selective update buffer and output it over the refresh port using a standard display controller output operation. The GPU-P 412 can manage one or more buffers as a ring buffer or linked buffer list of concatenated tiles and provide a continuous output over the SDVO output that the TSA-G 424 treats as a tile list. Various schemes can be used for the GPU-P to arbitrate the priority for placement in the list. This method may be the most efficient for utilizing a GPU-P that has less specific hardware for supporting multiple RTs and has little or no special selective update hardware.

In another preferred embodiment, the TSA-G 424 operates in conjunction with the GPU-P 412 to decide which tiles may require updating at the RT 300. The ability for the GPU-P 412 to manage status bits on a per tile basis may be too difficult and may group the tiles into large tiles or the full virtual RT display and only have a limited granularity for the status bits. Reducing the large tiles into smaller tile updates can be performed based on tracking signatures for each tile. The signature is typically generated the first time that the tile is processed and checked against subsequent signatures. The signatures can be generated and processed by the TSA-G 424 operating from the incoming data or in conjunction with the selective update hardware of the GPU-P 412. If the TSA-G 424 performs the signature checks for each tile, the network bandwidth to each RT 300 can be conserved. If the GPU-P 412 performs the signature checks then the bandwidth over the video path to the TSA-G 424 will also be conserved. GPU-P 412 can generate and manage a memory plane of signatures corresponding to the tiles where the status bits may be part of the signature plane or a separate plane. Alternatively, the status bits and signature bits may be managed in a RAM cache and managed with linked lists by GPU-P 412.

Depending on the type of graphics command generated by the graphics operations on the host 400 and the capabilities of the RT 300, the command may be encapsulated and sent for execution at the RT or the command may be executed locally by the GPU-P 412. In many cases, though the command is sent for execution at the RT, the command is also executed locally by the GPU-P 412 in order to keep a local copy of the virtual display. Ideally, any tiles that changed as a result of the redundant local graphics command will be filtered out with the status bits to prevent unnecessary tile update packets being sent to the RT. It will typically require less bandwidth to send the command instead of an encoded tile, but it is not always possible. Systems that manually manage a selective update buffer would also consider the commands that are being sent to the RT. Tiles that will be updated by commands executed at the RT would ideally not be placed into the selective update buffer by the GPU-P 412.

In another example, a graphics command intended for an RT is processed by the TSA-G 424 and broken into an encoded data transfer and a modified graphics command. For example, the host system may wish to perform a BitBlt operation from off screen memory or from a pattern to on-screen memory. This could readily be performed at the GPU-P 412 subsystem. However, at the RT the source data requested for the BitBlt is not cached. Therefore to be able to send the graphics command, it may first be necessary to encode, encapsulate and send the source data or pattern to the RT and then encapsulate and send a modified graphics command to the RT. This procedure can be offloaded by the TSA-G 424. While it is possible for the DirectX drivers to funnel commands through the GPU-P 412 which then outputs them to the TSA-G 424, it is often more efficient for the DirectX driver to also communicate them directly to the TSA-G 424.

Figure 7:
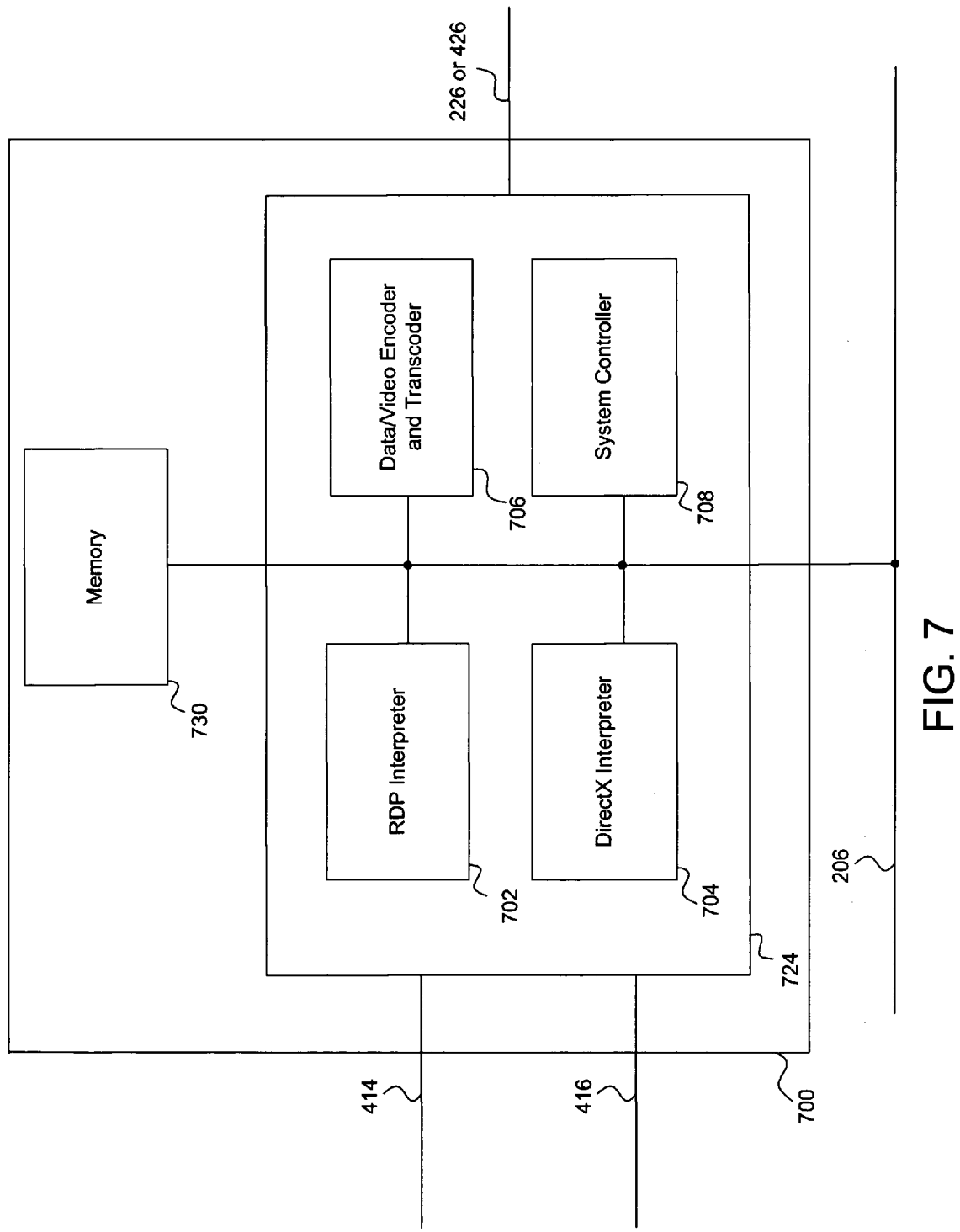
FIG. 7 is a block diagram showing details of an exemplary terminal services accelerator 224 of FIG. 2 or 424 of FIG. 4.

FIG. 7 shows the subsystem 700 and functional blocks of TSA 724 for a preferred embodiment of TSA 224 or TSA-G 424. The subsystem communicates with the tracking software running on the host 200 or host 400 and includes a connection to the host system bus 206 and may include direct connections via path 226 to the network subsystem. In the case of TSA-G 424, TSA 724 may also include via paths SDVO1 414 and SDVO2 416 a direct connection to the graphics controller GPU-P 412. Path 416 may be the second SDVO2 416 or a connection to another subsystem. Included in the subsystem is memory 730 which may be embedded into the TSA 724 or an external memory subsystem. Each functional block may also include its own internal memory as well.

The System Controller 708 manages the interfaces to the host system and other subsystems and performs some of the setup and management for the TSA 724. The DirectX Interpreter 704 offloads the DirectX software drivers running on the host system to manage 2D graphics commands, 3D graphics commands, Video Streams and other windowing functions. Combined with the RDP Interpreter 702 and the Data/Video Encoder and Transcoder 706, the TSA 724 offloads the host processor from performing many of the computationally intensive aspects of managing the RTs and can also optimize the commands, data and video streams to be sent from the host system to the various RTs.

In the case of system 200 where host based GPU 212 is not utilized for the RT display support, the TSA subsystem 700 can perform a variety of graphics based optimizations. Various pattern BitBlts, sources to screen destination BitBlts and other bitmap transfers can be enhanced by the RDP Interpreter 702. The RDP Interpreter 702 can intercept the calls from the host, encode the source data, pattern or bitmaps into a more efficient format via the Data/Video Encoder and Transcoder 706, transfer the encoded data, pattern or bitmap via system controller 708 and finally issue a modified graphics command to the RT 300. The destination RT will receive the encoded source data, pattern or bitmap, decode it if needed and then, upon receiving the modified graphics command, perform the intended operation. The transfers for the encoded data and the modified command may either be with RDP transfers or with RDP-like transfers that are supported by the TSA subsystem 700 and the RT 300.

For a video stream in system 200, the DirectX Interpreter 704 can intercept and offload the video stream processing and provide an optimal stream to the target RT. The first step in offloading is to make sure that the host processor is not performing the video decode on the host CPU. Host based decode has several downsides, the most significant two being, first, it takes a significant number of CPU cycles to perform the actual decode. Second, having decoded video frames at the host is not necessarily the best way to get frames displayed at the target RT. Instead, the DirectX Interpreter 704 intercepts the DirectX call, which in some versions of Microsoft Windows® may entail using DirectShow, to gain access to the video stream while it is still in compressed form. The DirectX Interpreter 704 may need to provide the RDP interface with a mock frame in order for the RDP to continue with normal operations.

Meanwhile, the System Controller 708 is aware of what video stream formats the RT is capable of decoding, what the network throughput from the host system to the RT nominally is, and what resolution and display characteristics are intended with the video stream. Knowing this information, the System Controller 708 sets up the Data/Video Encoder and Transcoder 706 to process the incoming video stream to produce the ideal stream for the network, RT and display output requirements. This may entail transcoding from one encoded format to another, transrating from one bitrate to another, changing the frame rate, changing the display format, changing the resolution or some combination of these. The RDP Interpreter 702 and System Controller 708 then encapsulate the processed bitstream and send it over the main system bus 206 or direct connection 226 for network processing.

In the case of system 400, the TSA subsystem 700 may include the functions just described with respect to system 200, but also includes additional support for operating in conjunction with GPU-P 412. There are several ways for RDP 702 and the GPU-P 412 to interact and the operations of TSA subsystem 700 will vary accordingly. Two embodiments are considered here in detail, the first being the "terminate and regenerate" and the second being "offload and enhance." Variations on the embodiments are also possible that can utilize aspects of each embodiment.

In the case of "terminate and regenerate" an RDP client is run on the host system. As far as the host is concerned, the RDP operations are terminated and the RDP client utilizes the GPU-P 412 to create a virtual display. As described earlier, the GPU-P 412 uses a virtual display space to support multiple virtual RTs by creating a single large display map where each user is offset within the map or where each virtual display is seen as a separate display with its own mapping. The RDP client software may need to make use of key exchange and security processing within the TSA subsystem 700 for RDP hosts that require secure client communications. As the RDP client receives commands from the RDP host, the client, utilizing GPU-P 412 renders the display frames into the display subsystem. GPU-P 412 then generates the appropriate selective updates which are sent to over path 414.

The selective update packets including rectangle tiles are then encoded, encapsulated and forwarded for network transmission. The primary reason to use "terminate and regenerate" instead of just passing the drawing commands to the RT 300 is when the request command is not supported at the RT. Other more subtle reasons based on bandwidth, type or sequence of commands and the relative performance of the RT may also factor in.

The "offload and enhance" may proceed with the tracking software layer redirecting the DirectX video and data streams. The DirectX interpreter 704 intercepts the host DirectX calls. The intercepted calls are offloaded to the Data/Video Encoder and Transcoder 706 which completes the function of the DirectX call. Offloading the function makes the host CPU 202 available for other users of the multi-user system. The encoding and transcoding can be completed with an understanding of the display environment and the networking bandwidth which allows optimal processing.

The RDP Interpreter 702 can also be used to manage the status bits when a graphics command is executed locally and forwarded to the RT for execution. The reason for the host graphics to execute the command is so that a current copy of the frame buffer can be managed for future use. Since the graphics command is being executed at the RT, the tiles that change on the host as a result of the graphics command do not need to have the selective update hardware send encoded tiles. To prevent this, the RDP Interpreter 702 needs to calculate which tiles are affected by the graphics command. The status bits in the S-Buffer that correspond to these tiles can be managed so that the tile based selective updates are not performed.

The tracking software layer can also be used to assist in the encoding choice for display frames that have changed and require generation of a display update stream. Recall that the encoding is performed to reduce the data required for the remote display system 300 to regenerate the display data generated by the host computer's graphics and display controller 412. The tracking software layer can help identify the type of data within a tile so as to allow the most optimal type of encoding to be performed. Some RTs may not have sufficient graphics processing capability to execute the graphics commands and may be sent encoded data that is processed by the GPU-P 412.

For example, if the tracking software layer identifies that a surface of tiles is real time video, then an encoding scheme more effective for video, which has smooth spatial transitions and temporal locality, can be used for those tiles. If the tracking software layer identifies that a surface of tiles is mostly text, then an encoding scheme more effective for the sharp edges and the ample white space of text can be used. Identifying what type of data is in what region is a complicated problem. However, this embodiment of a tracking software layer allows an interface into the graphics driver architecture of the host display system and host operating system that assists in this identification. For example, in Microsoft Windows®, a surface that utilizes certain DirectShow commands is likely to be video data whereas a surface that uses color expanding bit block transfers (Bit Blits) normally associated with text, is likely to be text. Each operating system and graphics driver architecture will have its own characteristic indicators. Other implementations can perform multiple types of data encoding in parallel and then choose to use the encoding scheme that produces the best results based on encoder feedback.

Some types of encoding schemes are particularly more useful for specific types of data, and some encoding schemes are less susceptible to the type of data. For example, RLE is very good for text and very poor for video, DCT based schemes are very good for video and very poor for text, and wavelet transform based schemes can do a good job for both video and text. Though any type of lossless or lossy encoding can be used in this system, wavelet transform encoding, which also can be of a lossless or lossy type, and in particular a progressive wavelet transform with a deterministic arithmetic coder that can encode each tile without concern for the surrounding tiles, is particularly well suited for this application. Derivatives of the JPEG2000 Wavelet encoder that tailor the processing for better real time execution are one possible implementation.

Figure 8:
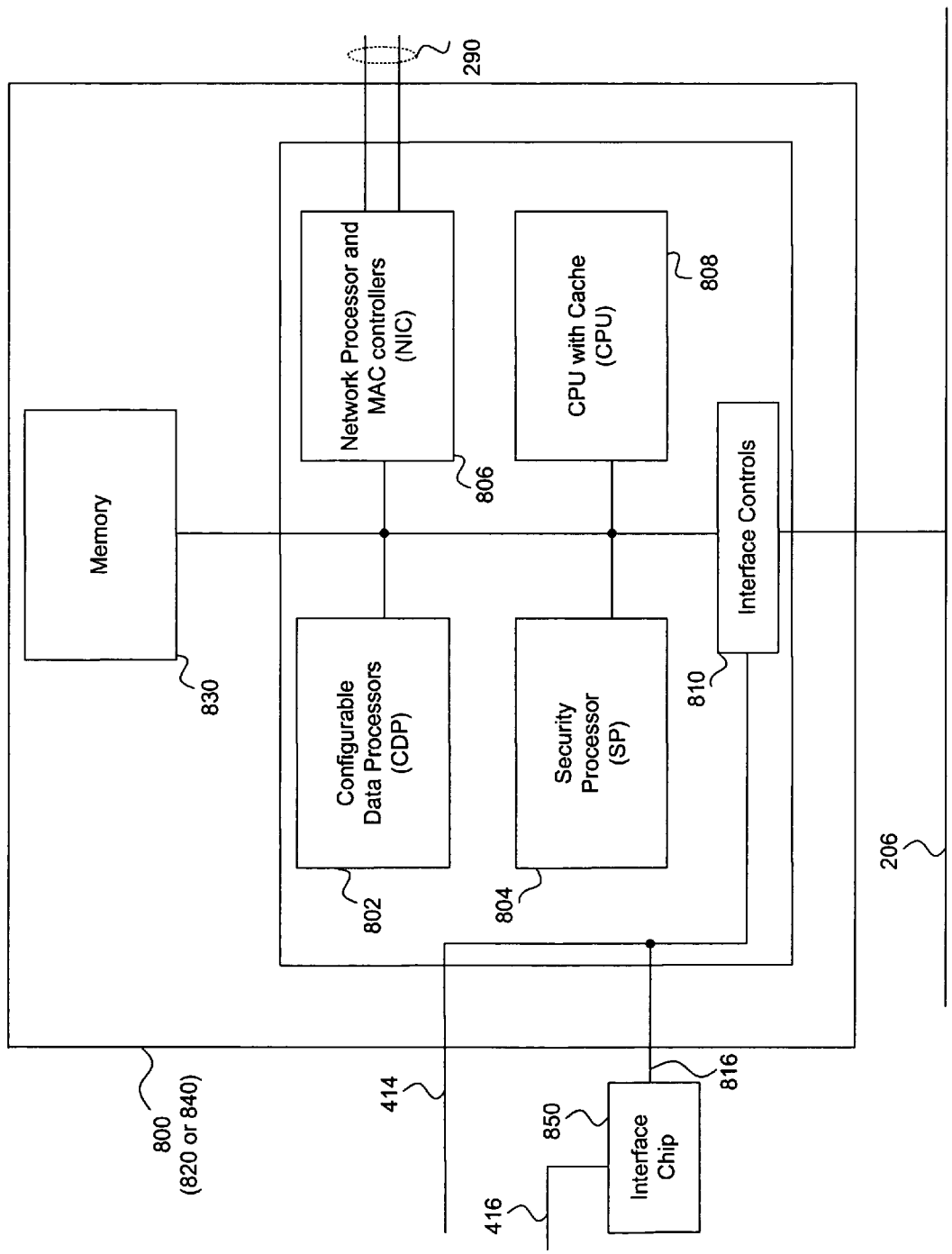
FIG. 8 a block diagram of an offload subsystem for accelerating terminal services, networking and other tasks.

FIG. 8 a block diagram of a preferred embodiment subsystem 800 (820 from FIG. 2 and 840 from FIG. 4) for offloading and accelerating networking, security, terminal services, storage and other tasks, such as Internet access, from a host processor. The offload subsystem 800 primarily communicates with the host system 200 or 400 over system bus 206. Connections SDVO1 414 and SDVO2 416 are optional and would be included either for host systems that include graphics processing for the RTs or for simpler graphics systems that provide redirection for a single remote Keyboard, Video and Mouse (KVM) for system administration over the network. The connections may be direct or through Interface Chip 850. Interface Controls 810 manages the various I/O connections. Network interfaces may include access to a WAN and access to the RTs. High speed networks such as Gigabit Ethernet are preferred but are not always practical. Lower speed networks such as 10/100 Ethernet, Power Line Ethernet, Coaxial cable based Ethernet, phone line based Ethernet or wireless Ethernet standards such as 802.11a, b, g, n, s and future derivatives as well as Ultra Wide Band (UWB) versions can also be supported.

KVM may be implemented and used for the convenience of remotely controlling the host "in band" using the main network connections and software running on the host CPU. Or KVM may operate "out of band" using as little of the main system resources as possible. When used "out of band" the video monitoring may occur using a network interface other than the main "in band" network connection. In addition, instead of the software for the remote KVM functions running on the main processor, a special separate Baseboard Management Controller (BMC) is typically included. The BMC may run a protocol such as Intelligent Platform Management Interface (IPMI). The BMC may provide its own network interface or may support a side port connection to the main network controller.

In order to support dynamic processing for the different offload tasks, the offload subsystem 800 uses processing blocks that are programmable and configurable and can be task switched and reconfigured quickly as the workload changes. Various memory blocks will be included in each of the processing blocks and a larger memory 830 may also be included. The CPU 808 is a generally programmable processor including its own cache memory and can perform the housekeeping and management for the offload subsystem 800 as well as perform some of the higher level protocol and interface processing. Network processors and MAC controllers 806 manage the Network Interface Control (NIC) functions of the offload subsystem and can manage multiple pipes of simultaneous communication. Special internal memory such as Content Address Memory (CAMs) as well as traditional memory may also be included within NIC 806. The complete NIC 806 functions may require additional processing from the Security Processor (SP) 804 and the Configurable Data Processors (CDPs) 802.

Configurable Data Processors 802 are designed to be readily reconfigured to perform different processing at throughputs normally associated with dedicated hardware blocks. By utilizing CDP 802 instead of dedicated hardware, the different offload tasks can be performed by the same hardware. Prior art methods for designing CDPs such as reconfigurable data paths, dynamic instruction sets, Very Long Instruction Word (VLIW), Single Instruction Multiple Data (SIMD), Multiple Instruction Multiple Data (MIMD), Digital Signal Processing (DSP) and other forms of reconfigurable computing can be combined to perform very high performance computations. The Security Processor 804 may be implemented by a form of the CDP 802, by more specialized hardware, or by a combination of the CDP 802 with additional dedicated hardware blocks for cryptography and key related functions.

For terminal services acceleration, the CDP 802 may be configured to perform data encoding for tiles and rectangles, various forms of transcoding or transrating on video or data, generation and comparison for tile signatures and the other tasks described under the TSA 224 or 424 section. For storage acceleration, the CDP 802 may be configured for different aspects of iSCSI, Fiber Channel (FC), Fiber Channel Internet Protocol (FCIP) and Internet Protocol related tasks. Connection 416 may be configured to connect to FC instead of SDVO2. For Internet content acceleration, CDP may be configured to process eXtensible Markup Language (XML) traffic, Simple Object Access Protocol (SOAP), HTTP traffic, Java Virtual Machine (JVM) and other traffic associated with Internet based communication.

For managing the incoming data over the SDVO1 214 and SDVO2 216 paths, special buffering and processing may be provided or the CDPs 802 may be configured to perform special tasks possibly including deconstructing large rectangles into tiles, processing tiles including signature generation and comparisons and managing the various packets as they relate to the target RTs. Prior tile signatures may be stored within the subsystem 800 so that as the new tiles are received, the signatures can be compared.

A GPU may have any number of physical and logical connections for the display output port including VGA, DVO, DVI, SDVO, Display Port or any number of higher or lower speed ports. As such, an interface chip 850 may be desired between the GPU display output port and the offload subsystem 800. The connections 816 from the offload subsystem may be implemented as PCI Express ports of any width. In one preferred embodiment, offload subsystem 800 functions as the PCI Express Root controller and Interface Controls 810 manages the PCI Express ports. The interface chip may perform some of the buffering as well as some of the preprocessing required. For example, the interface chip may buffer up multiple lines of display data and perform data packing, format conversion, color space conversion, subband decomposition or any number of other functions. In one preferred embodiment, the output from the graphics chip is 24 bit RGB data over a DVO connection 416. The interface chip 850 buffers up RGB data, converts it to YUV 4:4:4 data and unpacks the pixels into separate Y, U and V data packets. Offload subsystem 800 utilizing Interface Controls 810 performs the PCI Express Root control and the Y, U and V data packets are transmitted over path 816 to different areas of memory 830.

Offload subsystem 800 can be implemented by a programmable solution that also solves the general offload tasks for several unrelated operations. Servers may benefit from offloading the network, storage, security and other tasks. An offload processor can be designed to statically or dynamically balance the various offload tasks and accelerate the overall system throughput for any given workload. For example, the server may be performing server based computing for thin clients during the day and running a large database operation at night. During the day the offload engine will run the operations described for the TSA. At night the offload engine will run iSCSI acceleration for accessing the large database from the disk storage system. The flexibility may be managed by an on-board or on-chip management processor that tracks the various workloads. The granularity for switching between offload tasks can be extremely small. The offload engine may be designed to perform very fast context switching so that within a single session it could perform the network, terminal services, storage, security and other offload tasks for the same session.

Figure 9:
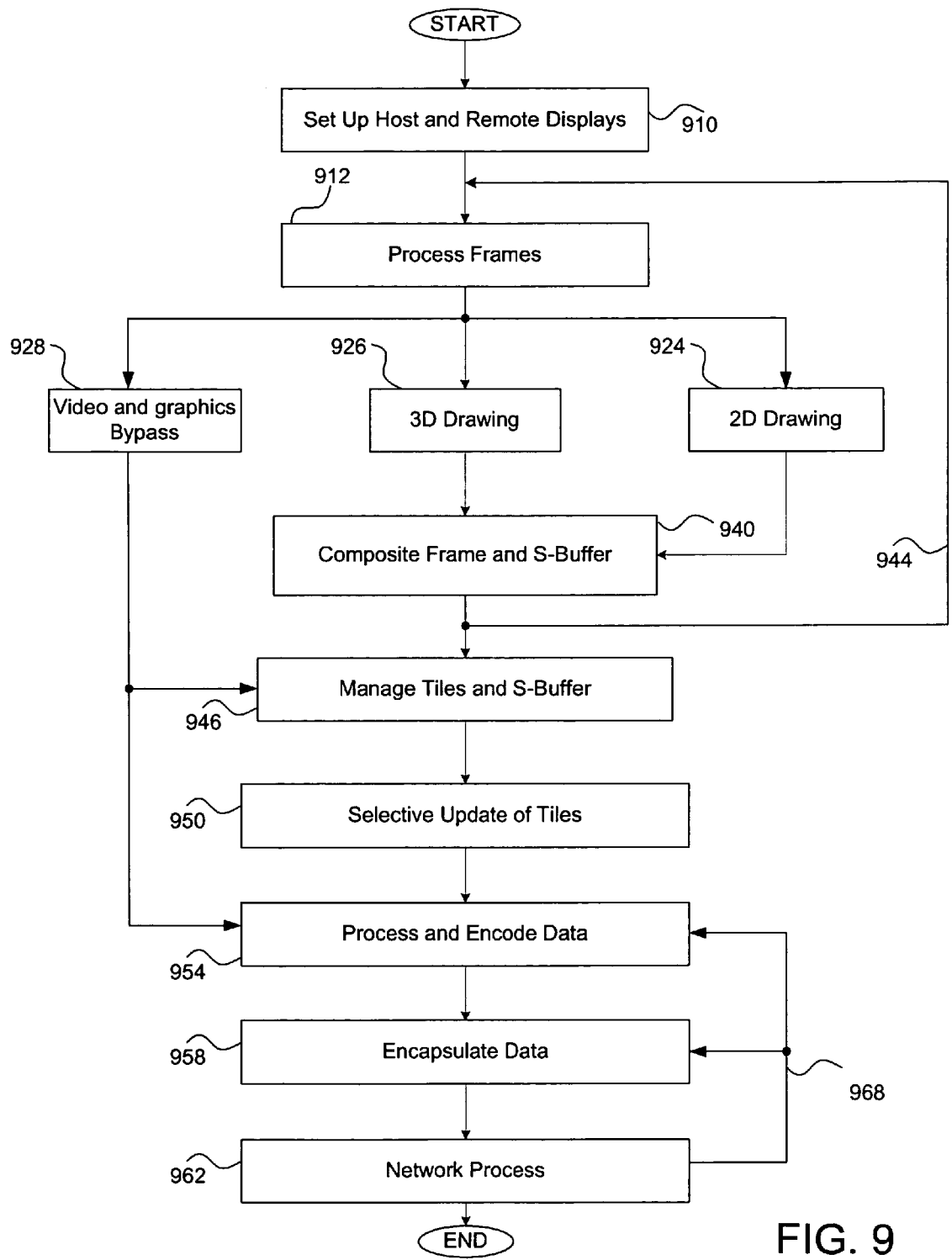
FIG. 9 is a flowchart of steps in a method for performing terminal services acceleration in accordance with one embodiment of the invention.

FIG. 9 is a flowchart of method steps for performing the terminal services acceleration procedure in accordance with one embodiment of the invention. For the sake of clarity, the procedure is discussed in reference to display data including video. However, procedures relating to audio, keyboard, mouse and other data are equally contemplated for use in conjunction with the invention. Initially, in step 910, multiuser server based computer 200 or 400 and remote terminal system 300 follow the various procedures to initialize and set up the host side and terminal side for the various subsystems to enable each RT. In step 912, the tracking software layer on the host 200 or host 400 operates in conjunction with the TSA 224 or TSA-G 424 to processes the various graphics and video calls to determine which operations need to be performed and where. Note that host system 200 does not utilize a resident host GPU or virtual frame buffer for performing RT graphics operations.

If graphics operations include 2D drawing, then, in step 924, the 2D drawing engine GPU-P 412 preferably processes the operations into the appropriate virtual display in RAM 430. Similarly, in step 926 3D drawing is performed to the appropriate virtual display in RAM by GPU 412. In step 928, TSA 224 or TSA-G 424 may determine that a video or graphics command will be forwarded to the appropriate RT. The flow through to step 940 may not be affected by bypass step 928. In step 940, the GPU-P 412 composites each virtual display into a frame which is suitable for display. This compositing can be performed with any combination of operations by the CPU subsystem 202, 2D engine, 3D Engine and any video processing elements within GPU 412. As part of the compositing step, for GPU-P 412 that includes S-Buffer management in the graphics processing hardware, the drawing engine updates the S-Buffer for the respective tiles.

As shown with return path 944, the GPU-P 412 may return to process the next frame for either the same RT or for a different RT as required. Once the compositing operation is performed, step 946 manages the tiles and the associated S-Buffer status bits and signature bits where appropriate. Step 946 considers any graphics and video operations that were processed through the video and graphics bypass step 928 that may affect the S-Buffer status bits. For example, if a drawing operation was both performed both in step 924 and bypassed via step 928 to the remote terminal, there is no need to perform the selective update on the tiles affected by that drawing operation as the operation will occur at the RT.

With the status bits and signatures for the tiles processed in step 946, which may occur within GPU-P 412 or in combination with TSA-G 424, step 950 can perform the selective update of the tiles. The tiles may be of fixed or variable size. The header information included with the tile will indicate the format as well as the intended RT destination. In step 954, the TSA-G 424 performs the necessary encoding of the tiles received from step 950. This encoding is preferably a deterministic scheme where the orientation of the data within the tile and the surrounding tiles need not be considered in the encoding step. Also in step 954, the video data and graphics commands that followed step 928 are processed. Video data may be transrated where the bit rate or frame rate is changed, scaled in either the frequency or spatial domain and transcoded to a different encoding standard where necessary. The network feedback via return path 968, along with the RT information, may both help determine the encoding step 954.

Step 954 also performs any graphics operations that require additional processing, which may entail encoding of graphics data. In step 958, TSA-G 424 performs the further encapsulation of the graphics commands, data transfers or video transfers processed in the prior step. The network feedback is also considered in this step with respect to the network characteristics such as bandwidth and latency and particular packet sizes and transmission issues. In step 962, the encapsulated packet is processed via the network controller 228 and the packet is transferred along the network to the appropriate RT 300.

The network process step 962 uses the information from the system control. This information can include information as to which remote display requires which frame update streams, what type of network transmission protocol is used for each frame update stream, and what the priority and retry characteristics are for each portion of each frame update stream. The network process step 962 utilizes the network controller 228 to manage any number of network connections. The various networks may include Gigabit Ethernet, 10/100 Ethernet, Power Line Ethernet, Coaxial cable based Ethernet, phone line based Ethernet, or wireless Ethernet standards such as 802.11a, b, g, n, s and future derivatives. Other non-Ethernet connections are also possible and can include USB, 1394a, 1394b, 1394c or other wireless protocols such as Ultra Wide Band (UWB) or WiMAX.

Figure 10:
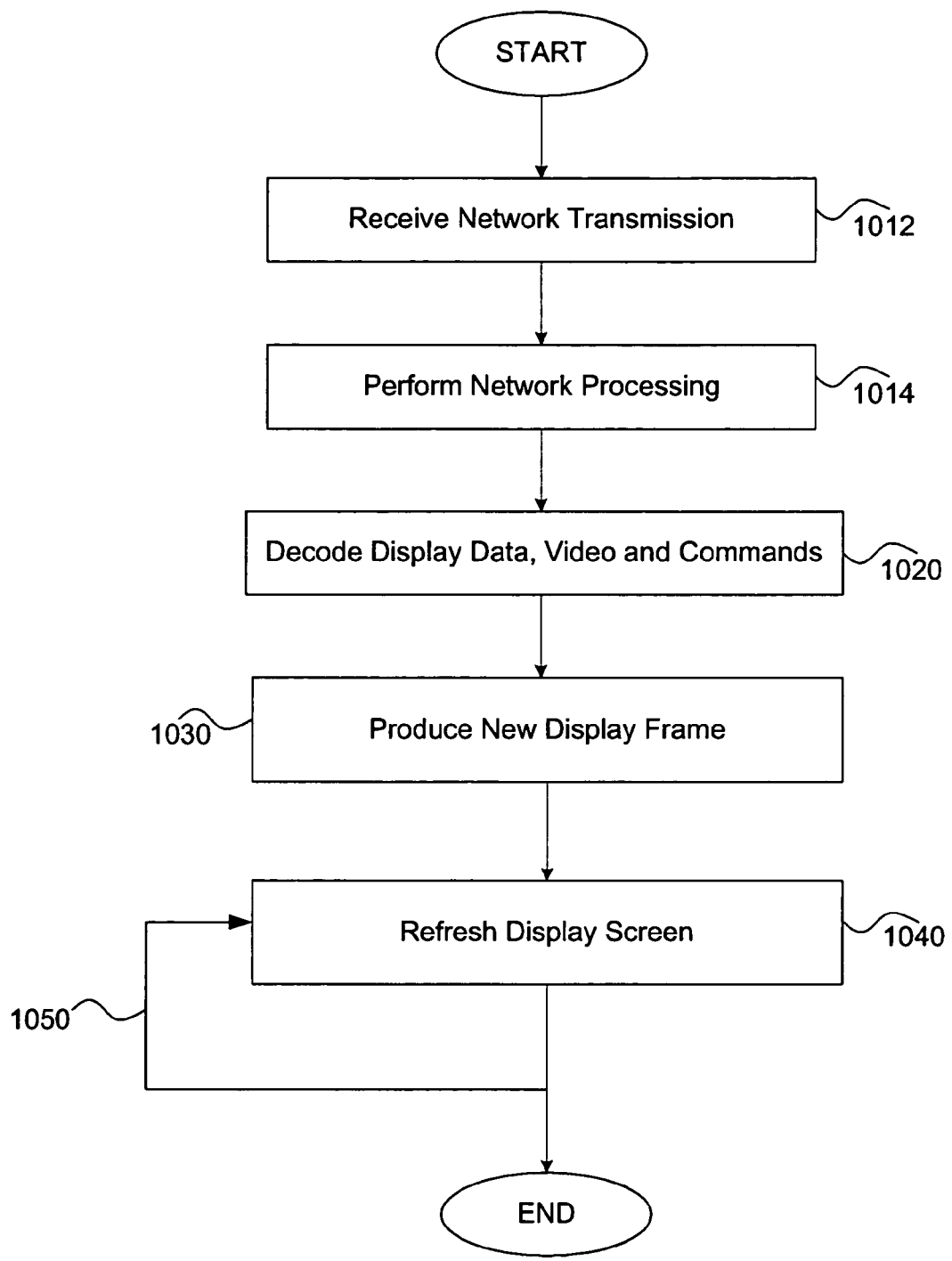
FIG. 10 is a flowchart of steps in a method for performing a network reception and display procedure for a remote terminal, in accordance with one embodiment of the invention.

FIG. 10 is a flowchart of steps in a method for performing a network reception and display procedure in accordance with one embodiment of the invention. For reasons of clarity, the procedure is discussed in reference to display data including video. However, procedures relating to audio and other data are equally contemplated for use in conjunction with the present invention.

In the FIG. 10 embodiment, initially, in step 1012, remote terminal 300 preferably receives a network transmission via path 290 from host computer 200. Then, in step 1014, network controller 336 preferably performs a network processing procedure to execute the network protocols to receive the transmitted data whether the transmission was wired or wireless.

In step 1020, CPU 324 interprets the incoming transmission to determine which functional unit the transmission is intended for. If the incoming transmission is a 2D graphics command, then CPU 324 will initialize an operation via 2D drawing engine 332; if a 3D command then 3D drawing engine 334; if a video data stream then video decoder 328; and if an encoded tile of data then data decoder 326. Some drawing commands may make use of both the drawing engine and the data decoder 326.

A varied number of commands and data transfers may take place and the various functional units operate and preferably manipulate the data information into an appropriate displayable format. In step 1030, the manipulated data from each of the functional units is assembled via frame manager 330 and may produce an updated display frame into RAM 312. The updated display frame may include display frame data from prior frames, the manipulated and decoded new frame data, and any processing required for concealing display data errors that occurred during transmission of the new frame data.

Finally, in step 1040, display controller 330 provides the most recently completed display frame data to remote terminal display screen 310 for viewing by a user of the remote terminal system 300. Display refresh is an asynchronous operation typically operating at 60 to 72 times per second between remote terminal controller 314 and display 310 to avoid flicker. Producing new display frames in step 1030 will typically occur significantly less often though when necessary may occur at 30 frames per second or more. In the absence of either a screen saver or power down mode, the display processor will continue to update the remote display screen 310 with the most recently completed display frame, as indicated with feedback path 1050, in the process of display refresh.

The present invention therefore implements a multi-user server based computer system that supports remote terminals that users may effectively utilize in a wide variety of applications. For example, a business may deploy racks of computer systems in one location and provide users at remote locations with very simple and low cost remote terminal systems 300 on their desktops. Different remote locations may be supported over a LAN, WAN or through another connection. The RTs may be desktop personal computers or notebook personal computers or in another system may be specialty devices such as cell phones, personal digital assistants or combined with other consumer products such as a portable video player, game machine or remote control system. Users may flexibly utilize the host computer of a multi-user system 100 to achieve the same level of software compatibility and a similar level of performance that the host system could provide to a local user. Therefore, the present invention effectively implements a flexible multi-user system that utilizes various heterogeneous components to facilitate optimal system interoperability and functionality.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

I claim:

1. A host computer system configured to support multiple remote terminals, comprising:
    a graphics and display subsystem having
        a display memory which can store display frames for multiple terminals;
        one or more drawing engines for generating display frames corresponding to display frames at a remote terminal, the display frames comprising sub frames wherein a size for each sub frame is configurable during run-time by the host computer system as a multiple of a minimum pixel block size of an algorithm for encoding the sub frames executing in the graphics and display subsystem; and
        means for tracking modified sub frames of the display frames and for performing selective updates based on this tracking, wherein said tracking comprises generating signatures and status bits identifying the modified sub frames, reducing the sub frames into smaller sub frames based on the signatures, determining a type of data contained in the modified sub frames, and selecting the algorithm for encoding the sub frames based on the type;
    means for communicatively coupling said graphics and display subsystem to a host CPU in said host computer system and
    means for managing the selective updates so that only the selective updates will be transferred via a network subsystem to corresponding ones of said remote terminals.

2. The system of claim 1 wherein modified sub frames are encoded to reduce bandwidth requirements prior to being transferred via said network subsystem.

3. The system of claim 1 wherein said graphics and display subsystem is configured to output said selective updates over a private connection to an encoding subsystem that encodes said selective updates prior to their transfer to said network subsystem.

4. The system of claim 3 wherein said encoding subsystem is further configured to perform additional tracking to determine if said selective updates are required to be transferred to said remote terminal.

5. The system of claim 3 wherein said encoding subsystem is configured to receive graphics commands either from said graphics and display subsystem or from said host CPU and process said graphics commands for transfer via said network subsystem to said corresponding remote terminal.

6. The system of claim 1 wherein said sub frames are fixed size tiles and said tracking is performed on said fixed size tiles.

7. A host computer system configured to support multiple remote terminals, comprising:
    a host CPU connected via a system bus to other subsystems within said host computer system;
    an offload subsystem for managing said remote terminals configured to:
        intercept graphics commands or video data on said bus prior to being processed by said host CPU and prior to sending graphics commands or video data to the remote terminals such that the host CPU does not process the graphics commands or video data; and
        process said intercepted graphics commands or video data as a function of video decoding capabilities at said multiple remote terminals and support remote terminals of different display sizes, further comprising at least one of transcoding, transrating, changing a frame rate, changing a display format, and changing a resolution; and
    a management subsystem configured to manage said intercepted and processed graphics commands or video data for transfer via a network subsystem to corresponding ones of said remote terminals; and
    a graphics and display subsystem configured to:
        generate display frames corresponding to display frames at the remote terminals, the display frames comprising sub frames wherein a size for each sub frame is configurable during runtime by the host computer system as a multiple of a minimum pixel block size of an algorithm for encoding the sub frames;
        track modified sub frames by generating signatures and status bits identifying the modified sub frames;

reduce the sub frames into smaller sub frames based on the signatures; and perform selective updates based on this tracking, further comprising determining a type of data contained in the modified sub frames and selecting an encoding algorithm based on the type.

8. The system of claim 7 wherein said graphics commands are intercepted and blocks of data associated with said graphics commands are encoded by said offload subsystem to reduce bandwidth required by said network transfer.

9. The system of claim 7 wherein said video data is intercepted by said offload subsystem and said video data is processed to match the network performance and decode capabilities of individual ones of said remote terminals and wherein said processing may include changing the bit rate (Transrating), frame rate, resolution or the coding algorithm (Transcoding).

10. The system of claim 7 wherein said further comprises a tracking software layer running on said host CPU.

11. The system of claim 7 wherein said offload subsystem includes a means for connecting to one or more display output paths from a graphics and display controller.

12. The system of claim 11 where said graphics and display controller is configured to produce output for one local display and remote management can be performed via said remote terminal.

13. The system of claim 11 where said offload subsystem is configured to perform encoding of said host system graphics and display output prior to network transmission to one of said remote terminals.

14. The system of claim 11 wherein said graphics and display controller supports multiple remote terminals and said connection provides said offload system with selective sub frame updates corresponding to different sub frames in multiple remote terminals.

15. In a system comprising a host computer including software, a main CPU, a graphics and display subsystem, and an offload engine, a method for operating a multi-user host system having multiple remote terminals, comprising:

using said offload engine to assist the main CPU in processing graphics commands and video data, wherein said processing said video data comprises at least one of changing bit rate, changing resolution, changing frame rate and changing encoding algorithm and said processing said graphics commands comprises encapsulating and encoding data associated with the graphics commands, said encoding executed such that extraneous video artifacts are substantially minimized regardless of an alignment of a current display window;

using said graphics and display subsystem to:
generate display frames corresponding to display frames at the remote terminals, the display frames comprising sub frames wherein a size for each sub frame is configurable during runtime by the host computer system as a multiple of a minimum pixel block size of an algorithm for encoding the sub frames;

track modified sub frames by generating signatures and status bits identifying the modified sub frames;

reduce the sub frames into smaller sub frames based on the signatures; and perform selective updates based on this tracking, further comprising determining a type of data contained in the modified sub frames and selecting an encoding algorithm based on the type;

determining which of said remote terminals is the destination for said processed graphics commands and said processed video data; and propagating said processed graphics commands and processed video data according to network protocol techniques through a network interface.

16. The method of claim 15 wherein said offload engine is configured to perform encoding of said selective update sub frames.

17. The method of claim 15 wherein said offload engine is also used to offload one or more other processing tasks from said main CPU.

* * * * *